United States Patent
Yamada et al.

(10) Patent No.: US 8,451,538 B2
(45) Date of Patent: May 28, 2013

(54) DIFFRACTIVE OPTICAL ELEMENT AND OPTICAL DEVICE

(75) Inventors: Kazuhiro Yamada, Osaka (JP); Yasuhiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 12/979,421

(22) Filed: Dec. 28, 2010

(65) Prior Publication Data
US 2011/0157701 A1   Jun. 30, 2011

(30) Foreign Application Priority Data
Dec. 28, 2009   (JP) .................. 2009-298067

(51) Int. Cl.
G02B 5/18    (2006.01)

(52) U.S. Cl.
USPC ....................................... 359/576

(58) Field of Classification Search
USPC .................................. 359/571, 576
See application file for complete search history.

(56) References Cited

U.S. PATENT DOCUMENTS

| | | | |
|---|---|---|---|
| 5,847,877 A | 12/1998 | Imamura et al. | |
| 6,157,488 A * | 12/2000 | Ishii | 359/569 |
| 2005/0219698 A1 | 10/2005 | Tanaka | |
| 2007/0047084 A1 | 3/2007 | Tanaka | |
| 2009/0231712 A1 | 9/2009 | Ushigome | |
| 2011/0157702 A1 * | 6/2011 | Yamada et al. | 359/576 |

FOREIGN PATENT DOCUMENTS

| | | |
|---|---|---|
| JP | 09-127321 | 5/1997 |
| JP | 2005-107299 | 4/2005 |
| JP | 2005-316414 | 11/2005 |
| JP | 2009-217139 | 9/2009 |

* cited by examiner

Primary Examiner — Alessandro Amari
(74) Attorney, Agent, or Firm — Renner, Otto, Boisselle & Sklar, LLP

(57) ABSTRACT

In a diffractive optical element, a first optical member and a second optical member are stacked, and a diffraction grating is formed at an interface between the first and second optical members. The diffractive optical element is configured so that the followings fall within a predetermined range: an inter-material gradient which is a ratio of an amount of change in reference refractive indexes between the first optical member and the second optical member, to an amount of change in principal dispersions between the first optical member and the second optical member; and a blaze wavelength of the diffraction grating.

7 Claims, 11 Drawing Sheets

DIFFRACTIVE OPTICAL ELEMENT AND OPTICAL DEVICE

CROSS-REFERENCE TO RELATED APPLICATION

This application claims priority to Japanese Patent Application No. 2009-298067 filed on Dec. 28, 2009, the disclosure of which including the specification, the drawings, and the claims is hereby incorporated by reference in its entirety.

BACKGROUND

The present disclosure relates to a diffractive optical element in which two optical members are stacked, and a diffraction grating is formed at an interface between the two optical members; and to an optical device including the diffractive optical element.

A diffractive optical element has been known, in which a plurality of optical members are stacked, and a relief pattern is formed at an interface between the optical members.

In a diffractive optical element described in, e.g., Japanese Patent Publication No. 09-127321, a relatively low-refractive high-dispersive optical material, and a relatively high-refractive low-dispersive optical material are stacked, and a diffraction grating having a saw-tooth cross-sectional shape is formed at an interface between the optical materials. More specifically, the diffractive optical element is configured so that a refractive index difference between the two optical materials is smaller for light having a shorter wavelength, and is larger for light having a longer wavelength. In a diffractive optical element described in Japanese Patent Publication No. 2009-217139, a combination of such optical materials reduces wavelength dependency of diffraction efficiency.

SUMMARY

However, even if two optical materials are selected under conditions described in Japanese Patent Publication No. 09-127321, the wavelength dependency of the diffraction efficiency cannot be sufficiently reduced. That is, there is room for improvement in reducing the wavelength dependency of the diffraction efficiency.

The present disclosure has been made in view of the foregoing, and it is an object of the present disclosure to reduce the wavelength dependency of the diffraction efficiency in the diffractive optical element in which the two optical materials are stacked, and the diffraction grating is formed at the interface between the two optical materials.

The present disclosure is to reduce the wavelength dependency of the diffraction efficiency considering a blaze wavelength in addition to a refractive index of the optical material. Specifically, the present disclosure is intended for a diffractive optical element including first and second optical members which are stacked, and which have a diffraction grating formed at an interface between the first and second optical members. In addition, in the diffractive optical element, expressions (1)-(3) or (4)-(6) are satisfied:

$$0.400 \leq \lambda_b \leq 0.460 \tag{1}$$

$$M \geq 1339242229.625 \times \lambda_b^6 - 3467101052.6675 \times \lambda_b^5 + 3739417158.03949 \times \lambda_b^4 - 2150706261.50666 \times \lambda_b^3 + 695699517.122797 \times \lambda_b^2 - 120005677.292515 \times \lambda_b + 8624042.63627238 \tag{2}$$

$$M \leq -1332094191.9375 \times \lambda_b^6 + 3449257434.95906 \times \lambda_b^5 - 3720886459.39374 \times \lambda_b^4 + 2140458094.5947 \times \lambda_b^3 - 692516647.829495 \times \lambda_b^2 + 119479540.773725 \times \lambda_b - 8587922.98149309 \tag{3}$$

$$0.560 \leq \lambda_b \leq 0.650 \tag{4}$$

$$M \geq 79855185.5390625 \times \lambda_b^6 - 291350087.799711 \times \lambda_b^5 + 442815879.530274 \times \lambda_b^4 - 358873164.839002 \times \lambda_b^3 + 163567486.506001 \times \lambda_b^2 - 39753252.4920047 \times \lambda_b + 4024975.0978217 \tag{5}$$

$$M \leq -82526017.6289062 \times \lambda_b^6 + 301239002.375121 \times \lambda_b^5 - 458051447.988191 \times \lambda_b^4 + 371372898.921825 \times \lambda_b^3 - 169325896.092434 \times \lambda_b^2 + 41165269.8970695 \times \lambda_b - 4168933.51144255 \tag{6}$$

where "$\lambda_b$" is a blaze wavelength (μm); $M=\{n_1(\lambda_2)-n_2(\lambda_2)\}/\{n_1(\lambda_1)-n_1(\lambda_3)-n_2(\lambda_1)+n_2(\lambda_3)\}$; "$n_1(\lambda)$" is a refractive index of the first optical member for incident light having a wavelength $\lambda$; "$n_2(\lambda)$" is a refractive index of the second optical member for the incident light having the wavelength $\lambda$; "$\lambda_1$" is 0.486133 μm; "$\lambda_2$" is 0.587562 μm; and "$\lambda_3$" is 0.656273 μm.

In addition, another aspect of the invention is intended for a diffractive optical member including first and second optical members which are stacked, and which have a diffraction grating formed at an interface between the first and second optical members. In the diffractive optical element, expressions (19)-(23) are satisfied depending on a blaze wavelength (μm):

(i) when $0.402 \leq \lambda_b < 0.423$, $$M \geq -5.67 \tag{19}$$

$$M \leq -2059169.7421875 \times \lambda_b^6 + 5816357.49453125 \times \lambda_b^5 - 6788300.15627441 \times \lambda_b^4 + 4193835.50001671 \times \lambda_b^3 - 1448014.62341355 \times \lambda_b^2 + 265253.074154754 \times \lambda_b - 20174.8108751328 \tag{20}$$

(ii) when $0.423 \leq \lambda_b < 0.664$, $$-5.67 \leq M \leq -4.70 \tag{21}$$

(iii) when $0.664 \leq \lambda_b \leq 0.695$, $$M \geq -1737676.76663208 \times \lambda_b^6 + 6606429.15555359 \times \lambda_b^5 - 10426872.1241855 \times \lambda_b^4 + 8742622.74935995 \times \lambda_b^3 - 4106195.43419261 \times \lambda_b^2 + 1024012.6733048 \times \lambda_b - 105911.832822947 \tag{22}$$

$$M \leq -4.70 \tag{23}$$

where $M=\{n_1(\lambda_2)-n_2(\lambda_2)\}/\{n_1(\lambda_1)-n_1(\lambda_3)-n_2(\lambda_1)+n_2(\lambda_3)\}$; "$n_1(\lambda)$" is a refractive index of the first optical member for incident light having a wavelength $\lambda$; "$n_2(\lambda)$" is a refractive index of the second optical member for the incident light having the wavelength $\lambda$; "$\lambda_1$" is 0.486133 μm; "$\lambda_2$" is 0.587562 μm; and "$\lambda_3$" is 0.656273 μm.

According to the present disclosure, the wavelength dependency of the diffraction efficiency across an entire visible wavelength range can be reduced.

DETAILED DESCRIPTION

An embodiment of the present disclosure will be described in detail below with reference to the drawings.

Embodiment of the Disclosure

Figure 1:
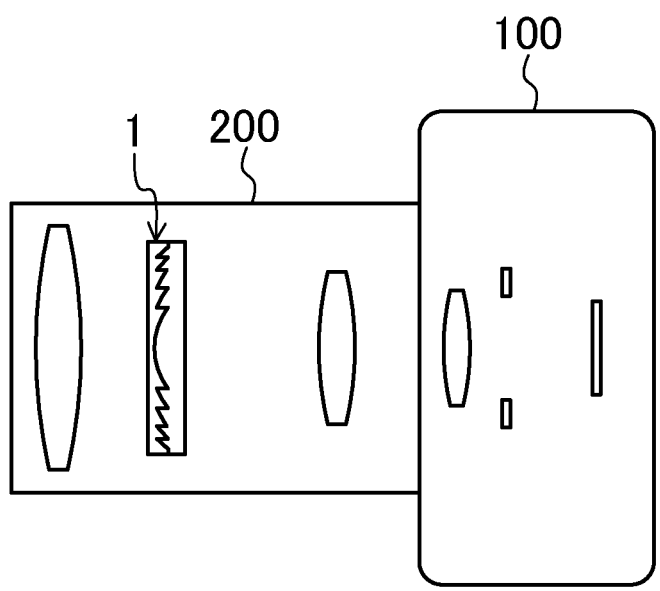
FIG. 1 is a schematic view of a camera to which an interchangeable lens of an embodiment of the present disclosure is attached.
Figure 2:
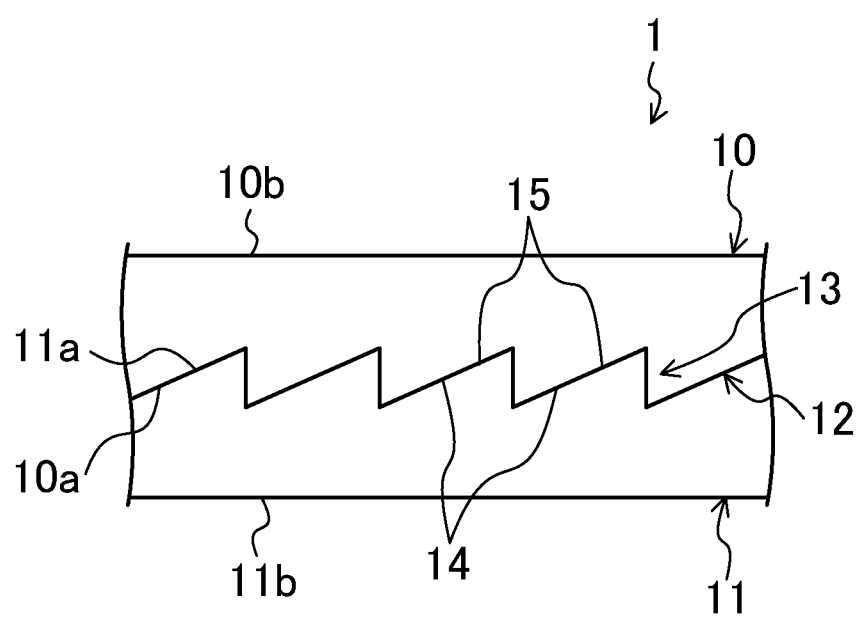
FIG. 2 is a schematic cross-sectional view of a diffractive optical element.

FIG. 1 is a schematic view of an interchangeable lens 200 with a diffractive optical element 1 illustrated as an example of the present embodiment, and a camera 100 to which the interchangeable lens 200 is attached. FIG. 2 is a schematic cross-sectional view of the diffractive optical element 1.

The interchangeable lens 200 is detachable from the camera 100. The interchangeable lens 200 is, e.g., a telephoto zoom lens. In the interchangeable lens 200, the diffractive optical element 1 serves as a lens element in addition to a refractive lens.

The diffractive optical element 1 is formed by stacking a first optical member 10 and a second optical member 11 which are transparent to light. In the present embodiment, the first optical member 10 is made of resin material, and the second optical member 11 is made of glass material. The first optical member 10 and the second optical member 11 are bonded together. A diffraction grating 13 having a saw-tooth cross-sectional shape is formed at an interface 12 defined by a bonding surface 10a of the first optical member 10 and a bonding surface 11a of the second optical member 11. Optical power of the diffraction grating 13 has wavelength dependency. Thus, the diffraction grating 13 provides the substantially same phase difference to light having different wavelengths, and diffracts the light having different wavelengths at diffraction angles which are different from each other.

Specifically, a recessed first diffraction grating 14 is formed in the bonding surface 10a of the first optical member 10, and a raised second diffraction grating 15 is formed in the bonding surface 11a of the second optical member 11. The first diffraction grating 14 includes a plurality of recessed sections which extend in a circumferential direction around an optical axis of the diffractive optical element 1, and which are concentrically and regularly arranged around the optical axis. Each of the recessed sections has a surface which is substantially parallel to the optical axis, and a surface inclined toward the optical axis; and has a substantially triangular cross section. In addition, the second diffraction grating 15 includes a plurality of raised sections which extend in the circumferential direction around the optical axis of the diffractive optical element 1, and which are concentrically and regularly arranged around the optical axis. Each of the raised sections has a surface which is substantially parallel to the optical axis, and a surface inclined toward the optical axis; and has a substantially triangular cross section. The first diffraction grating 14 and the second diffraction grating 15 have the same grating height and the same grating pitch. That is, the raised sections of the second diffraction grating 15 are fully engaged with the recessed sections of the first diffraction grating 14. As a result, the bonding surface 10a of the first optical member 10 contacts the bonding surface 11a of the second optical member 11 with no gap, thereby defining the single interface 12. The first diffraction grating 14 and the second diffraction grating 15 together form the diffraction grating 13. Note, however, that a middle layer of, e.g., air, an anti-reflective film, and an adhesive, which has a refractive index different from those of the first diffraction grating 14 and the second diffraction grating 15 may be interposed between the bonding surface 10a and the bonding surface 11a as long as the bonding surface 10a and the bonding surface 11a are substantially parallel to each other.

Chamfering or R-chamfering may be applied to a valley of the recessed section of the first diffraction grating 14, and to a ridge of the raised section of the second diffraction grating 15 (i.e., a peak of the triangle as viewed in cross section). The inclined surface of the recessed section of the first diffraction grating 14, and the inclined surface of the raised section of the second diffraction grating 15 may be curved so as to define an aspherical or spherical surface.

A surface 10b of the first optical member 10 on a side opposite to the bonding surface 10a, and a surface 11b of the second optical member 11 on a side opposite to the bonding surface 11a are formed into flat surfaces parallel to each other. As illustrated in FIG. 1, e.g., light entering the diffractive optical element 1 from the first optical member 10 side is diffracted by the diffraction grating 13 to exit to the second optical member 11 side. Note that the surface 10b of the first optical member 10 and the surface 11b of the second optical member 11 may not be parallel to each other.

The diffractive optical element 1 configured as described above satisfies an expression (12):

$$-6.30 \leq M \leq -4.55 \quad (12)$$

where $M=\{n_1(\lambda_2)-n_2(\lambda_2)\}/\{n_1(\lambda_1)-n_1(\lambda_3)-n_2(\lambda_1)+n_2(\lambda_3)\}$; "$n_1(\lambda)$" represents a refractive index of the first optical member for incident light having a wavelength $\lambda$; "$n_2(\lambda)$" represents a refractive index of the second optical member for the incident light having the wavelength $\lambda$; "$\lambda_1$" is 0.486133 µm; "$\lambda_2$" is 0.587562 µm; and "$\lambda_3$" is 0.656273 µm.

Specifically, in the expression (12), "$\lambda_1$" is an F-line wavelength; "$\lambda_2$" is a d-line wavelength; and "$\lambda_3$" is a C-line wavelength. That is, a numerator of the fraction representing "M" is a difference between a reference refractive index ($n_1(\lambda_2)$) of the first optical member 10 and a reference refractive index ($n_2(\lambda_2)$) of the second optical member 11; and a denominator is a difference between a principal dispersion ($n_1(\lambda_1)-n_1(\lambda_3)$) of the first optical member 10 and a principal dispersion $(n_2(\lambda_1)-n_2(\lambda_3))$ of the second optical member 11. That is, "M" represents a ratio of an amount of change (difference) in the reference refractive indexes between the first optical member 10 and the second optical member 11, to an amount of change (difference) in the principal dispersions between the first optical member 10 and the second optical member 11. In the specification of the present disclosure, "M" is referred to as an "inter-material gradient."

Wavelength dependency of diffraction efficiency of the diffractive optical element 1 is changed depending on the inter-material gradient M. The first and second optical members 10 and 11 are selected so that the expression (12) is satisfied, and then the first and second optical members 10 and 11 are used to produce the diffractive optical element 1. Thus, the diffraction efficiency of the diffractive optical element 1 can be uniformly enhanced across an entire visible wavelength range (range in which a wavelength is 0.400 μm-0.700 μm). That is, the wavelength dependency of the diffraction efficiency across the entire visible wavelength range can be reduced, and an average value of the diffraction efficiency across the entire visible wavelength range (hereinafter referred to as an "average diffraction efficiency across visible wavelength") can be improved.

Further, the diffractive optical element 1 satisfies expressions (1)-(3) or (4)-(6):

$$0.400 \leq \lambda_b \leq 0.460 \quad (1)$$

$$M \geq 1339242229.625 \times \lambda_b^6 - 3467101052.6675 \times \lambda_b^5 + 3739417158.03949 \times \lambda_b^4 - 2150706261.50666 \times \lambda_b^3 + 695699517.122797 \times \lambda_b^2 - 120005677.292515 \times \lambda_b + 8624042.63627238 \quad (2)$$

$$M \leq -1332094191.9375 \times \lambda_b^6 + 3449257434.95906 \times \lambda_b^5 - 3720866459.39374 \times \lambda_b^4 + 2140458094.5947 \times \lambda_b^3 - 692516647.829495 \times \lambda_b^2 + 119479540.773725 \times \lambda_b - 8587922.98149309 \quad (3)$$

$$0.560 \leq \lambda_b \leq 0.650 \quad (4)$$

$$M \geq 79855185.5390625 \times \lambda_b^6 - 291350087.799711 \times \lambda_b^5 + 442815879.530274 \times \lambda_b^4 - 358873164.839002 \times \lambda_b^3 + 163567486.506001 \times \lambda_b^2 - 39753252.4920047 \times \lambda_b + 4024975.0978217 \quad (5)$$

$$M \leq -82526017.6289062 \times \lambda_b^6 + 301239002.375121 \times \lambda_b^5 - 458051447.988191 \times \lambda_b^4 + 371372898.921825 \times \lambda_b^3 - 169325896.092434 \times \lambda_b^2 + 41165269.8970695 \times \lambda_b - 4168933.51144255 \quad (6)$$

where "$\lambda_b$" is a blaze wavelength (μm).

The wavelength dependency of the diffraction efficiency of the diffractive optical element 1 is also changed depending on the blaze wavelength $\lambda_b$. That is, the blaze wavelength $\lambda_b$ and the first and second optical members 10 and 11 which satisfy the expressions (1)-(3) or (4)-(6) are selected, thereby further improving the average diffraction efficiency across visible wavelength in the diffractive optical element 1. Consequently, the wavelength dependency of the diffraction efficiency across the entire visible wavelength range can be further reduced. Specifically, the average diffraction efficiency across visible wavelength can be greater than or equal to 99%.

More preferably, the diffractive optical element 1 satisfies expressions (7)-(9) or (10)-(12):

$$0.414 \leq \lambda_b \leq 0.450 \quad (7)$$

$$M \geq 8640558390 \times \lambda_b^6 - 22380686760.9125 \times \lambda_b^5 + 24152666332.3616 \times \lambda_b^4 - 13900381865.2731 \times \lambda_b^3 + 4499685153.88293 \times \lambda_b^2 - 776796861.97245 \times \lambda_b + 55871807.7607997 \quad (8)$$

$$M \leq -10194570607.5 \times \lambda_b^6 + 26421929920.0925 \times \lambda_b^5 - 28531440313.7911 \times \lambda_b^4 + 16430708380.9751 \times \lambda_b^3 - 5322137506.01958 \times \lambda_b^2 + 919367999.430877 \times \lambda_b - 66169280.3167743 \quad (9)$$

$$0.576 \leq \lambda_b \leq 0.638 \quad (10)$$

$$M \geq 414967120.90625 \times \lambda_b^6 - 1512185155.554 \times \lambda_b^5 + 2295832124.5403 \times \lambda_b^4 - 1858788442.14493 \times \lambda_b^3 + 846446107.028953 \times \lambda_b^2 - 205553837.085777 \times \lambda_b + 20796969.7061844 \quad (11)$$

$$M \leq -415113085.03125 \times \lambda_b^6 + 1512854887.23366 \times \lambda_b^5 - 2297046202.65628 \times \lambda_b^4 + 1859918525.18878 \times \lambda_b^3 - 847020476.777119 \times \lambda_b^2 + 205705688.874443 \times \lambda_b - 20813340.0724713 \quad (12)$$

As described above, the blaze wavelength $\lambda_b$ and the first and second optical members 10 and 11 which satisfy the expressions (7)-(9) or (10)-(12) are selected, thereby further improving the average diffraction efficiency across visible wavelength in the diffractive optical element 1. Consequently, the wavelength dependency of the diffraction efficiency across the entire visible wavelength range can be further reduced. Specifically, the average diffraction efficiency across visible wavelength can be greater than or equal to 99.15%.

The diffractive optical element 1 preferably satisfies expressions (13)-(15) or (16)-(18):

$$0.417 \leq \lambda_b \leq 0.447 \quad (13)$$

$$M \geq 30852412488 \times \lambda_b^6 - 79922201016.868 \times \lambda_b^5 + 86260883694.3531 \times \lambda_b^4 - 49652199810.7073 \times \lambda_b^3 + 16075519544.8254 \times \lambda_b^2 - 2775681903.96431 \times \lambda_b + 199683678.257006 \quad (14)$$

$$M \leq -30584648780 \times \lambda_b^6 + 79226520575.83 \times \lambda_b^5 - 85507821323.3087 \times \lambda_b^4 + 49217462978.353 \times \lambda_b^3 - 15934356981.3252 \times \lambda_b^2 + 2751237292.99331 \times \lambda_b - 197920088.494362 \quad (15)$$

$$0.581 \leq \lambda_b \leq 0.632 \quad (16)$$

$$M \geq 1306900213.875 \times \lambda_b^6 - 4761329435.24312 \times \lambda_b^5 + 7227224601.18296 \times \lambda_b^4 - 5850360432.19395 \times \lambda_b^3 + 2663701689.21584 \times \lambda_b^2 - 646780698.688165 \times \lambda_b + 65431590.8897632 \quad (17)$$

$$M \leq -1286672013.625 \times \lambda_b^6 + 4687809955.26 \times \lambda_b^5 - 7115891461.56486 \times \lambda_b^4 + 5760442316.00334 \times \lambda_b^3 - 2622849972.06735 \times \lambda_b^2 + 636881343.787066 \times \lambda_b - 64431960.7758904 \quad (18)$$

As described above, the blaze wavelength $\lambda_b$ and the first and second optical members 10 and 11 which satisfy the expressions (13)-(15) or (16)-(18) are selected, thereby further improving the average diffraction efficiency across visible wavelength in the diffractive optical element 1. Consequently, the wavelength dependency of the diffraction efficiency across the entire visible wavelength range can be further reduced. Specifically, the average diffraction efficiency across visible wavelength can be greater than or equal to 99.20%.

The diffractive optical element 1 may satisfy expressions (19)-(23) depending on the blaze wavelength $\lambda_b$ (μm):

(i) when $0.402 \leq \lambda_b < 0.423$, $$M \geq -5.67 \quad (19)$$

$$M \leq -2059169.7421875 \times \lambda_b^6 + 5816357.49453125 \times \lambda_b^5 - 6788300.15627441 \times \lambda_b^4 + 4193835.50001671 \times \lambda_b^3 - 1448014.62341355 \times \lambda_b^2 + 265253.074154754 \times \lambda_b - 20174.8108751328 \quad (20)$$

(ii) when $0.423 \leq \lambda_b < 0.664$, $$-5.67 \leq M \leq -4.70 \tag{21}$$

(iii) when $0.664 \leq \lambda_b \leq 0.695$, $$M \geq -1737676.76663208 \times \lambda_b^6 + 6606429.15555359 \times \lambda_b^5 - 10426872.1241855 \times \lambda_b^4 + 8742622.74935995 \times \lambda_b^3 - 4106195.43419261 \times \lambda_b^2 + 1024012.6733048 \times \lambda_b - 105911.832822947 \tag{22}$$

$$M \leq -4.70 \tag{23}$$

The blaze wavelength $\lambda_b$ and the first and second optical members 10 and 11 are selected within a range in which the expressions (19)-(23) are satisfied, and therefore the average diffraction efficiency across visible wavelength in the diffractive optical element 1 can be greater than or equal to 98%. Although the average diffraction efficiency across visible wavelength is slightly degraded as compared to a range specified by the expressions (1)-(6), a range of the blaze wavelength $\lambda_b$ to be selected can be expanded. That is, if the first and second optical members 10 and 11 are properly selected (i.e., the first and second optical members 10 and 11 are selected so as to satisfy the expressions (19)-(23)), the blaze wavelength $\lambda_b$ can be selected within $0.402 \leq \lambda_b \leq 0.695$ which is a substantially full range of the visible wavelength range. As described above, the range of the blaze wavelength $\lambda_b$ to be selected can be expanded, and the average diffraction efficiency across visible wavelength can be greater than or equal to 98% even in such a case.

The diffractive optical element 1 is configured so that an absorption coefficient $\alpha$ (mm$^{-1}$) of the first optical member 10 and a grating height h (μm) of the diffraction grating 13 satisfy expressions (24) and (25):

$$\alpha \geq 0.04 \tag{24}$$

$$h \leq 263.18 \times \alpha^{-0.9454} \tag{25}$$

Within a range in which the expressions (24) and (25) are satisfied, even if material which is not optically transparent (i.e., material having an absorption coefficient $\alpha$ of greater than or equal to 0.04 mm$^{-1}$) is used, the high diffraction efficiency can be realized. Thus, such material can be employed as the optical material of the first optical member 10. Specifically, the diffraction efficiency for the blaze wavelength $\lambda_b$ can be greater than 85%.

That is, types of material to be employed as the optical material of the diffractive optical element 1 are not infinite. Thus, when the first and second optical members 10 and 11 are selected so that the inter-material gradient M falls within a predetermined range as described above, a range of material selection is considerably narrowed. However, as long as the high diffraction efficiency can be realized, a certain level of absorption is allowed. Specifically, since the optical material satisfying the expressions (24) and (25) has the high diffraction efficiency, such material can be employed as the optical material of the first optical member 10. Consequently, the wavelength dependency of the diffraction efficiency can be reduced, and a range of the first optical member 10 to be selected can be expanded.

Thus, according to the present embodiment, the diffractive optical element 1 is configured so that the inter-material gradient M between the first and second optical members 10 and 11 satisfies the expression (12), thereby improving the average diffraction efficiency across visible wavelength. Consequently, the wavelength dependency of the diffraction efficiency across the entire visible wavelength range can be reduced.

When employing the diffractive optical element 1 in an optical device intended for white light, such as the interchangeable lens 200, it is required that the diffractive optical element 1 has the high diffraction efficiency across the entire visible wavelength range. The diffractive optical element 1 of the present embodiment has the low wavelength dependency of the diffraction efficiency across the entire visible wavelength range, and therefore can be employed in the optical device intended for white light.

Further, the diffractive optical element 1 is configured so that the blaze wavelength $\lambda_b$ and the inter-material gradient M between the first and second optical members 10 and 11 satisfy the expressions (1)-(3) or (4)-(6), thus the average diffraction efficiency across visible wavelength can be greater than or equal to 99%. Consequently, the wavelength dependency of the diffraction efficiency across the entire visible wavelength range can be further reduced.

The diffractive optical element 1 is preferably configured so that the blaze wavelength $\lambda_b$ and the inter-material gradient M between the first and second optical members 10 and 11 satisfy the expressions (7)-(9) or (10)-(12), thus the average diffraction efficiency across visible wavelength can be greater than or equal to 99.15%. Consequently, the wavelength dependency of the diffraction efficiency across the entire visible wavelength range can be further reduced.

More preferably, the diffractive optical element 1 is configured so that the blaze wavelength $\lambda_b$ and the inter-material gradient M between the first and second optical members 10 and 11 satisfy the expressions (13)-(15) or (16)-(18), thus the average diffraction efficiency across visible wavelength can be greater than or equal to 99.20%. Consequently, the wavelength dependency of the diffraction efficiency across the entire visible wavelength range can be still further reduced.

The diffractive optical element 1 is configured so as to satisfy the expressions (19)-(23) depending on the blaze wavelength $\lambda_b$ (μm). Thus, the range of the blaze wavelength $\lambda_b$ to be selected can be expanded, and the average diffraction efficiency across visible wavelength can be greater than or equal to 98%. Consequently, the wavelength dependency of the diffraction efficiency across the entire visible wavelength range can be reduced.

The diffractive optical element 1 is configured so as to satisfy the expressions (24) and (25). Thus, the high diffraction efficiency can be maintained, and the light absorption is allowed. Consequently, a range of the optical material to be selected can be expanded.

EXAMPLES

Figure 3:
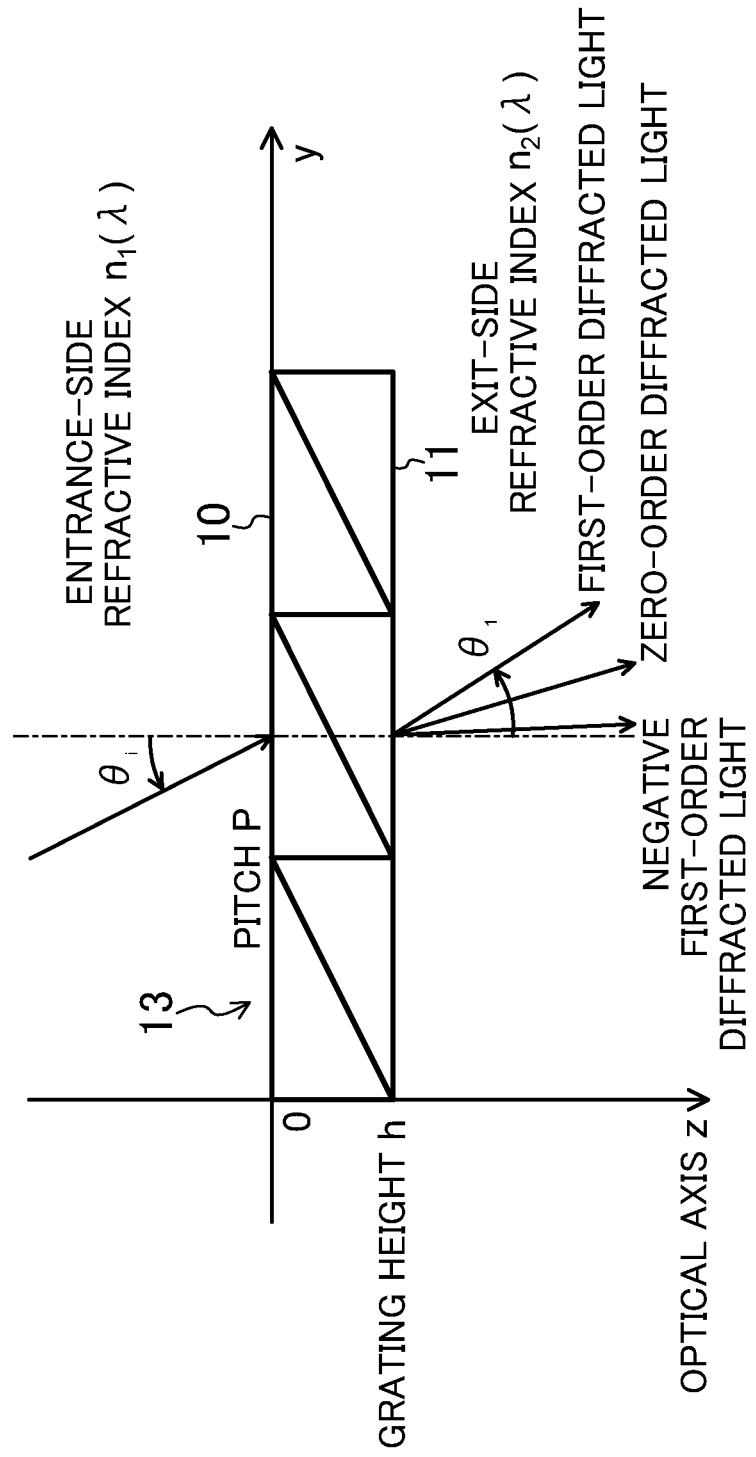
FIG. 3 is a schematic diagram of a diffraction grating.

Examples of the diffractive optical element will be described below. FIG. 3 is a schematic cross-sectional diagram of a diffraction grating.

First, a diffraction grating 13 illustrated in FIG. 3 is assumed. In this case, expressions (26) and (27) are satisfied:

$$\phi(\lambda) = (h/\lambda) \times \{n_1(\lambda)\cos \theta_m - n_2(\lambda)\cos \theta_i\} \tag{26}$$

$$n_2(\lambda)\sin \theta_m = n_1(\lambda)\sin \theta_i + m\lambda/P \tag{27}$$

where "$\phi(\lambda)$" represents a phase difference; "h" represents a grating height (μm); "$\lambda$" represents a wavelength (μm); "m" represents a diffraction order; "$n_1(\lambda)$" represents a refractive index of a first optical member for a wavelength $\lambda$; "$n_2(\lambda)$" represents a refractive index of a second optical member for a wavelength $\lambda$; "$\theta_i$" represents an angle of incidence (degrees); "$\theta_m$" represents a m-order diffraction angle (degrees); and "P" represents a grating pitch (cycle) (μm).

The phase difference $\phi(\lambda)$ is used to obtain a diffraction efficiency $\eta_m(\lambda)$ of m-order diffracted light for incident light having the wavelength $\lambda$ based on an expression (28):

$$\eta_m(\lambda) = \sin c^2(\phi(\lambda) - m) \tag{28}$$

In order to obtain a diffraction efficiency of first-order diffracted light for light incident in a direction parallel to an optical axis, $\theta_i = 0$ and $m=1$ are assumed. $P \gg \lambda$ is typically satisfied. Thus, the expression (27) provides $\theta_m = 0$. Consequently, each of the expressions (26) and (28) provides:

$$\phi(\lambda) = (h/\lambda) \times \{n_1(\lambda) - n_2(\lambda)\} \tag{29}$$

$$\eta_1(\lambda) = \sin c^2(\phi(\lambda) - 1) \tag{30}$$

That is, the phase difference $\phi(\lambda)$ for each wavelength $\lambda$ of the visible wavelength range can be obtained based on the expression (29) by changing the wavelength $\lambda$ in a visible wavelength range. Further, by substituting the phase difference into the expression (30), a diffraction efficiency $\eta_1(\lambda)$ of first-order diffracted light for each wavelength $\lambda$ of the visible wavelength range can be obtained. Then, the obtained diffraction efficiency $\eta_1(\lambda)$ is averaged across the visible wavelength range, and therefore an average diffraction efficiency $\eta$ across visible wavelength can be obtained, which is an average value of the diffraction efficiency $\eta_1(\lambda)$ of first-order diffracted light in the visible wavelength range.

However, the expression (29) is a function not only for the wavelength $\lambda$, but also for the grating height h. The grating height h is determined depending on the blaze wavelength $\lambda_b$. That is, the blaze wavelength $\lambda_b$ is equivalent to a diffraction efficiency $\eta_m(\lambda)$ of 1 (i.e., 100%), thereby providing $\phi(\lambda_b) - m = 0$ based on the expression (28). This example is intended for the first-order diffracted light, and therefore $\phi(\lambda_b) = 1$ when $m=1$. When such a value is substituted into the expression (29), and the expression (29) is rearranged, $$h = \lambda_b / \{n_1(\lambda_b) - n_2(\lambda_b)\} \tag{31}$$

As for material, a refractive index $n_d$ and an Abbe number $\nu_d$ of which at a d line are given, and which has typical wavelength dispersion, a refractive index $n(\lambda)$ for each wavelength $\lambda$ (μm) can be calculated based on the following Hertzberger's expressions (32)-(34):

$$A(\lambda) = 0.088927 \times \lambda^2 - 1.294878 + 0.37349/(\lambda^2 - 0.035) + 0.005799/(\lambda^2 - 0.035)^2 \tag{32}$$

$$B(\lambda) = 0.001255 - 0.007058 \times \lambda^2 + 0.001071/(\lambda^2 - 0.035) - 0.000218/(\lambda^2 - 0.035)^2 \tag{33}$$

$$n(\lambda) = 1 + (n_d - 1) \times \{1 + B(\lambda) + (A(\lambda)/\nu_d)\} \tag{34}$$

Thus, the blaze wavelength $\lambda_b$ and the materials of the first and second optical members 10 and 11 (i.e., a refractive index $n_1(\lambda_d)$ and an Abbe number $\nu_{d1}$ at a d line of the first optical member 10, and a refractive index $n_2(\lambda_d)$ and an Abbe number $\nu_{d2}$ at a d line of the second optical member 11) are first determined. Next, a refractive index $n_1(\lambda_b)$ of the first optical member 10 and a refractive index $n_2(\lambda_b)$ of the second optical member 11 for the blaze wavelength are obtained based on the expressions (32)-(34), and then such values are substituted into the expression (31) to obtain the grating height h. The obtained grating height h is substituted into the expression (29), and the wavelength $\lambda$ is changed in the visible wavelength range. Then, the diffraction efficiency $\eta_1(\lambda)$ of first-order diffracted light for each wavelength $\lambda$ is obtained based on the expression (30). At this point, the refractive index $n_1(\lambda)$ of the first optical member 10 and the refractive index $n_2(\lambda)$ of the second optical member 11 for each wavelength $\lambda$ are obtained based on the expressions (32)-(34). Finally, the diffraction efficiency $\eta_1(\lambda)$ of first-order diffracted light for each wavelength $\lambda$ is averaged across the visible wavelength range to obtain the average diffraction efficiency $\eta$ across visible wavelength.

Further, the inter-material gradient M is obtained based on an expression (35):

$$M = \{n_1(\lambda_2) - n_2(\lambda_2)\} / \{n_1(\lambda_1) - n_1(\lambda_3) - n_2(\lambda_1) + n_2(\lambda_3)\} \tag{35}$$

where "$n_1(\lambda)$" represents a refractive index of the first optical member for incident light having a wavelength $\lambda$; "$n_2(\lambda)$" represents a refractive index of the second optical member for the incident light having the wavelength $\lambda$; "$\lambda_1$" is 0.486133 μm; "$\lambda_2$" is 0.587562 μm; and "$\lambda_3$" is 0.656273 μm. As described above, the refractive index $n_1(\lambda)$ of the first optical member 10 and the refractive index $n_2(\lambda)$ of the second optical member 11 for each of the wavelengths $\lambda_1$, $\lambda_2$, and $\lambda_3$ are obtained based on the expressions (32)-(34).

Thus, an average diffraction efficiency $\eta(\lambda_b, M)$ across visible wavelength for a certain inter-material gradient M and the blaze wavelength $\lambda_b$ can be obtained.

The foregoing calculation is performed while changing the inter-material gradient M (i.e., at least one of the refractive index $n_1(\lambda_d)$ and the Abbe number $\nu_{d1}$ at the d line of the first optical member 10; and the refractive index $n_2(\lambda_d)$ and the Abbe number $\nu_{d2}$ at the d line of the second optical member 11) and the blaze wavelength $\lambda_b$. In such a manner, the average visible wavelength diffraction efficiencies $\eta(\lambda_b, M)$ for various inter-material gradients M and blaze wavelengths $\lambda_b$ can be obtained. Specifically, the blaze wavelength $\lambda_b$ is changed by 0.001 μm within a range of 0.400 μm-0.700 μm. In addition, the refractive index $n_1(\lambda_d)$ at the d line of the first optical member 10 is fixed to 1.60000; the Abbe number $\nu_{d1}$ of the first optical member 10 is fixed to 27.00; the refractive index $n_2(\lambda_d)$ at the d line of the second optical member 11 is fixed to 1.65000. The Abbe number $\nu_{d2}$ of the second optical member 11 is changed to vary the inter-material gradient M. The results are illustrated in FIG. 4.

Figure 4:
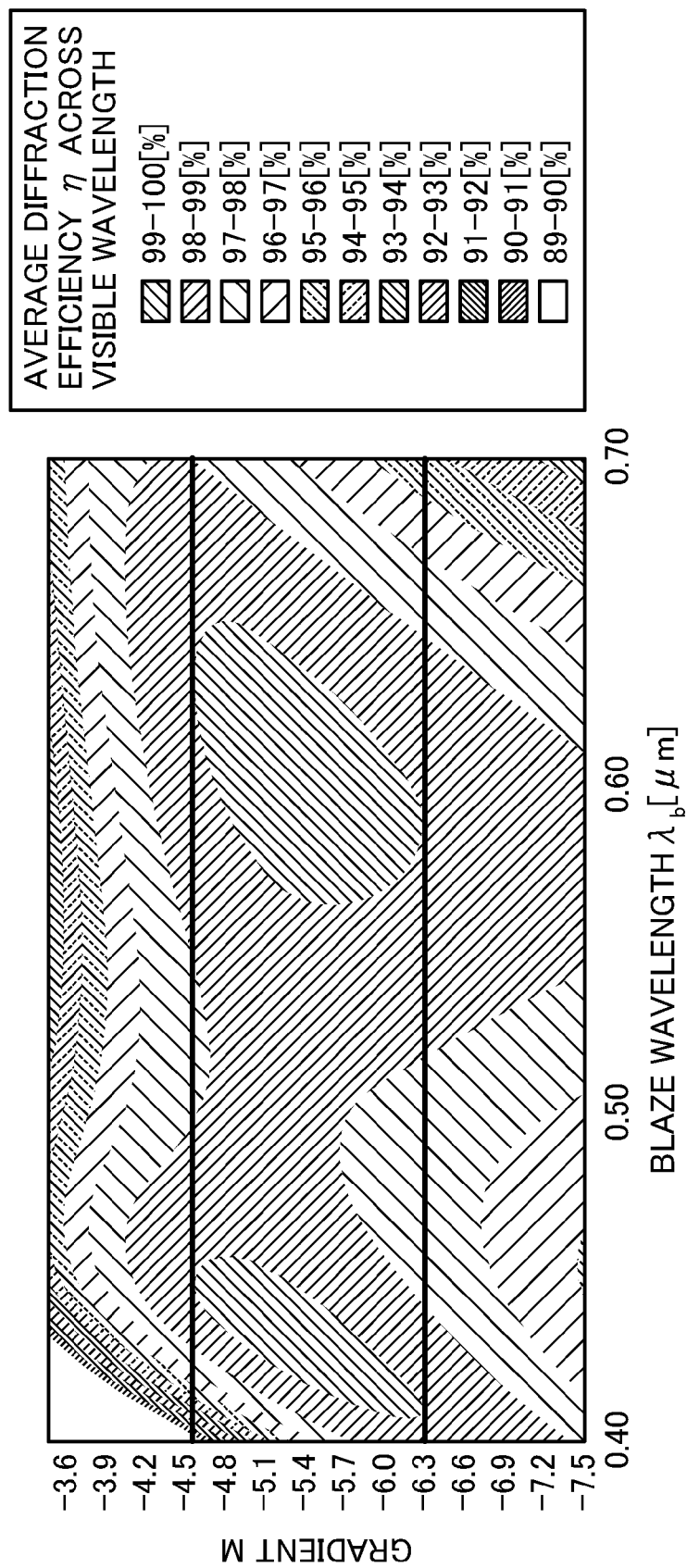
FIG. 4 is a graph illustrating a relationship of an average diffraction efficiency across visible wavelength with an inter-material gradient M and a blaze wavelength $\lambda_b$), and is a graph illustrating a preferable range of the inter-material gradient M.

As will be seen from FIG. 4, the average diffraction efficiency $\eta$ across visible wavelength can be improved within a range specified by an expression (12):

$$-6.30 \leq M \leq -4.55 \tag{12}$$

Specifically, selection of the suitable blaze wavelength $\lambda_b$ allows the average diffraction efficiency $\eta$ across visible wavelength to be greater than or equal to 98%, or further to be greater than or equal to 99% in some cases. The maximum value of the diffraction efficiency for the blaze wavelength $\lambda_b$ is a constant value of 100%. Thus, the improvement of the average diffraction efficiency $\eta$ across visible wavelength means reduction in deviation of the diffraction efficiency for each wavelength from 100%. That is, it means that the wavelength dependency of the diffraction efficiency across the entire visible wavelength range is reduced. The blaze wavelength $\lambda_b$ is a design wavelength, and therefore can be relatively freely selected within, e.g., a range in which a desired optical performance can be realized in the diffractive optical element 1. In particular, as in the diffractive optical element 1, if the diffraction efficiency is uniformly high across the entire visible wavelength range, the high diffraction efficiency is realized for any wavelengths in the visible wavelength range. Thus, there is less limitation on the selection of the blaze wavelength $\lambda_b$. Consequently, as long as the first and second optical members 10 and 11 are selected so that the inter-material gradient M falls within the range specified by the expression (12), the blaze wavelength $\lambda_b$ is adjusted as necessary to reduce the wavelength dependency of the diffraction efficiency in the visible wavelength range.

Figure 5:
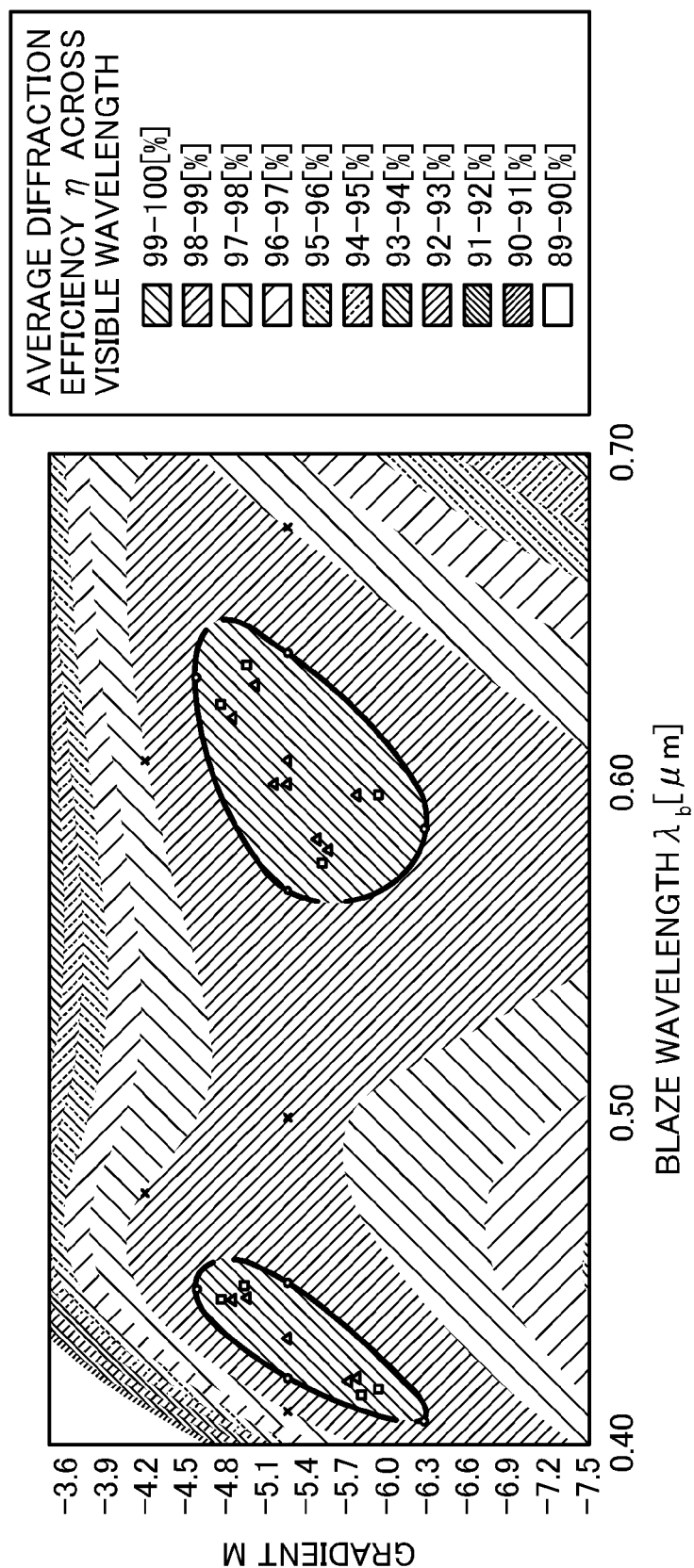
FIG. 5 is a graph illustrating the relationship of the average diffraction efficiency across visible wavelength with the inter-material gradient M and the blaze wavelength $\lambda_b$, and is a graph illustrating preferable ranges of the inter-material gradient M and the blaze wavelength $\lambda_b$.
Figure 6:
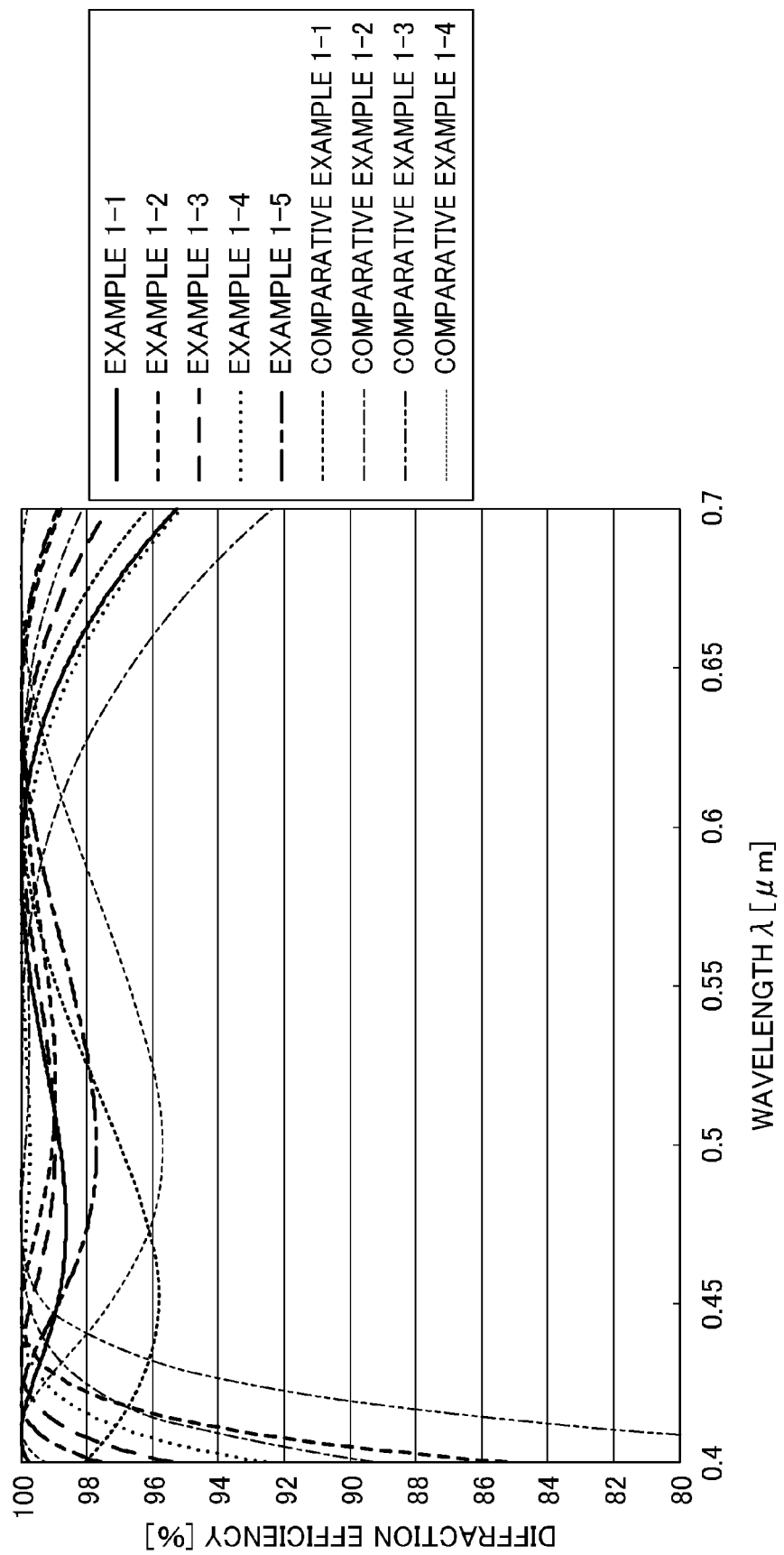
FIG. 6 is a graph illustrating a diffraction efficiency in a visible wavelength range, which corresponds to Table 1.

Within a range specified by expressions (1)-(3) or (4)-(6), the average diffraction efficiency $\eta$ across visible wavelength can be further improved. The ranges corresponding to the expressions (1)-(3) and (4)-(6) are illustrated in FIG. 5. Data in some examples and comparative examples is illustrated in Tables 1 and 2, and the diffraction efficiency in the visible wavelength range is illustrated in FIG. 6. A graph of the average diffraction efficiency η across visible wavelength based on the inter-material gradient M and the blaze wavelength $\lambda_b$ in FIG. 5 is the same as that in FIG. 4.

$$0.400 \leq \lambda_b \leq 0.460 \tag{1}$$

$$M \geq 1339242229.625 \times \lambda_b^6 - 3467101052.6675 \times \lambda_b^5 + 3739417158.03949 \times \lambda_b^4 - 2150706261.50666 \times \lambda_b^3 + 695699517.122797 \times \lambda_b^2 - 120005677.292515 \times \lambda_b + 8624042.63627238 \tag{2}$$

$$M \leq -1332094191.9375 \times \lambda_b^6 + 3449257434.95906 \times \lambda_b^5 - 3720886459.39374 \times \lambda_b^4 + 2140458094.5947 \times \lambda_b^3 - 692516647.829495 \times \lambda_b^2 + 119479540.773725 \times \lambda_b - 8587922.98149309 \tag{3}$$

$$0.560 \leq \lambda_b \leq 0.650 \tag{4}$$

$$M \geq 79855185.5390625 \times \lambda_b^6 - 291350087.799711 \times \lambda_b^5 + 442815879.530274 \times \lambda_b^4 - 358873164.839002 \times \lambda_b^3 + 163567486.506001 \times \lambda_b^2 - 39753252.4920047 \times \lambda_b + 4024975.0978217 \tag{5}$$

$$M \leq -82526017.6289062 \times \lambda_b^6 + 301239002.375121 \times \lambda_b^5 - 458051447.988191 \times \lambda_b^4 + 371372898.921825 \times \lambda_b^3 - 169325896.092434 \times \lambda_b^2 + 41165269.8970695 \times \lambda_b - 4168933.51144255 \tag{6}$$

TABLE 1

| | First Optical Member | | | Second Optical Member | | | Gradient M | Blaze Wavelength $\lambda_b$ (μm) | Average Diffraction Efficiency η across Visible Wavelength | |
|---|---|---|---|---|---|---|---|---|---|---|
| | Material | Refractive Index $n_d$ | Abbe Number $\nu_d$ | Material | Refractive Index $n_d$ | Abbe Number $\nu_d$ | | | | |
| Example 1-1 | UV Curable Resin | 1.60000 | 27.00 | Hypothetical Glass | 1.65000 | 45.62 | −6.27 | 0.409/0.587 | 99.0% | ○ |
| Example 1-2 | UV Curable Resin | 1.60000 | 27.00 | Hypothetical Glass | 1.65000 | 57.50 | −4.58 | 0.447/0.632 | 99.0% | ○ |
| Example 1-3 | UV Curable Resin | 1.60000 | 27.00 | Hypothetical Glass | 1.65000 | 51.19 | −5.25 | 0.432/0.607 | 99.3% | Δ |
| Example 1-4 | UV Curable Resin | 1.60000 | 27.00 | Hypothetical Glass | 1.65000 | 51.19 | −5.25 | 0.449/0.569 | 99.0% | ○ |
| Example 1-5 | UV Curable Resin | 1.60000 | 27.00 | Hypothetical Glass | 1.65000 | 51.19 | −5.25 | 0.420/0.641 | 99.0% | ○ |
| Example 1-6 | Acrylate UV Curable Resin | 1.606 | 26.00 | Phosphate Optical Glass | 1.65650 | 48.7 | −5.14 | 0.600 | 99.3% | Δ |
| Example 1-7 | Acrylate UV Curable Resin | 1.606 | 26.00 | K-VC78 Manufactured by Sumita Optical Glass Inc. | 1.66955 | 55.4 | −5.66 | 0.588 | 99.2% | Δ |
| Example 1-8 | SiO$_2$TI$_2$O Sol-Gel Glass | 1.718 | 19.3 | K-VC89 Manufactured by Sumita Optical Glass Inc. | 1.81000 | 41.0 | −5.25 | 0.600 | 99.3% | Δ |
| Comparative Example 1-1 | UV Curable Resin | 1.60000 | 27.00 | Hypothetical Glass | 1.65000 | 51.19 | −5.25 | 0.410/0.678 | 98.0% | × |
| Comparative Example 1-2 | UV Curable Resin | 1.60000 | 27.00 | Hypothetical Glass | 1.65000 | 51.19 | −5.25 | 0.499 | 98.2% | × |
| Comparative Example 1-3 | UV Curable Resin | 1.60000 | 27.00 | Hypothetical Glass | 1.65000 | 63.17 | −4.19 | 0.476/0.607 | 98.0% | × |
| Comparative Example 1-4 | UV Curable Resin | 1.60000 | 27.00 | Hypothetical Glass | 1.65000 | 41.53 | −7.61 | 0.375/0.607 | 98.0% | × |

TABLE 2

| | First Optical Member | | | Second Optical Member | | | Gradient M | Blaze Wavelength $\lambda_b$ (μm) | Average Diffraction Efficiency η across Visible Wavelength | |
|---|---|---|---|---|---|---|---|---|---|---|
| | Material | Refractive Index $n_d$ | Abbe Number $\nu_d$ | Material | Refractive Index $n_d$ | Abbe Number $\nu_d$ | | | | |
| Example 1-9 | UV Curable Resin | 1.60000 | 27.00 | Hypothetical Glass | 1.65000 | 47.37 | −5.92 | 0.417/0.592 | 99.15% | □ |
| Example 1-10 | UV Curable Resin | 1.60000 | 27.00 | Hypothetical Glass | 1.65000 | 55.58 | −4.75 | 0.444/0.623 | 99.15% | □ |
| Example 1-11 | UV Curable Resin | 1.60000 | 27.00 | Hypothetical Glass | 1.65000 | 53.72 | −4.94 | 0.636 | 99.16% | □ |
| Example 1-12 | UV Curable Resin | 1.60000 | 27.00 | Hypothetical Glass | 1.65000 | 49.50 | −5.50 | 0.577 | 99.15% | □ |
| Example 1-13 | UV Curable Resin | 1.60000 | 27.00 | Hypothetical Glass | 1.65000 | 53.99 | −4.91 | 0.448 | 99.16% | □ |
| Example 1-14 | UV Curable Resin | 1.60000 | 27.00 | Hypothetical Glass | 1.65000 | 47.79 | −5.80 | 0.415 | 99.15% | □ |
| Example 1-15 | UV Curable Resin | 1.60000 | 27.00 | Hypothetical Glass | 1.65000 | 47.95 | −5.77 | 0.420/0.595 | 99.20% | Δ |
| Example 1-16 | UV Curable Resin | 1.60000 | 27.00 | Hypothetical Glass | 1.65000 | 54.66 | −4.84 | 0.442/0.620 | 99.20% | Δ |
| Example 1-17 | UV Curable Resin | 1.60000 | 27.00 | Hypothetical Glass | 1.65000 | 53.18 | −5.00 | 0.630 | 99.21% | Δ |
| Example 1-18 | UV Curable Resin | 1.60000 | 27.00 | Hypothetical Glass | 1.65000 | 49.63 | −5.48 | 0.583 | 99.21% | Δ |
| Example 1-19 | UV Curable Resin | 1.60000 | 27.00 | Hypothetical Glass | 1.65000 | 53.63 | −4.95 | 0.445 | 99.21% | Δ |
| Example 1-20 | UV Curable Resin | 1.60000 | 27.00 | Hypothetical Glass | 1.65000 | 48.32 | −5.70 | 0.419 | 99.21% | Δ |

That is, a relationship with the blaze wavelength $\lambda_b$ is considered in addition to the inter-material gradient M, thereby further improving the average diffraction efficiency η across visible wavelength. Specifically, as will be seen from FIG. 5, the average diffraction efficiency η across visible wavelength can be greater than or equal to 99%. In other words, the inter-material gradient M and the blaze wavelength $\lambda_b$ are selected so that the expressions (2) and (3) are satisfied in a range in which the blaze wavelength $\lambda_b$ satisfies the expression (1). Alternatively, the inter-material gradient M and the blaze wavelength $\lambda_b$ are selected so that the expressions (5) and (6) are satisfied in a range in which the blaze wavelength $\lambda_b$ satisfies the expression (4). In such a manner, the average diffraction efficiency η across visible wavelength can be further improved. As will be seen from FIG. 6, the deviation of the diffraction efficiency for each wavelength from 100% is reduced by improving the average diffraction efficiency η across visible wavelength. Consequently, the wavelength dependency of the diffraction efficiency across the entire visible wavelength range can be further reduced. In addition, a less inter-material gradient M (i.e., a smaller absolute value of the inter-material gradient M) results in more degradation of the diffraction efficiency on a shorter wavelength side, whereas a greater inter-material gradient M (i.e., a larger absolute value of the inter-material gradient M) results in more degradation of the diffraction efficiency on a longer wavelength side.

The expressions (1) and (4) provide a rough estimate of the blaze wavelength $\lambda_b$, and even the blaze wavelength $\lambda_b$ falling within such an estimate may not satisfy the expressions (2) and (3), or (5) and (6). That is, it is required that the blaze wavelength $\lambda_b$ satisfies the expression (1) or (4), as well as the expressions (2) and (3), or (5) and (6).

Figure 7:
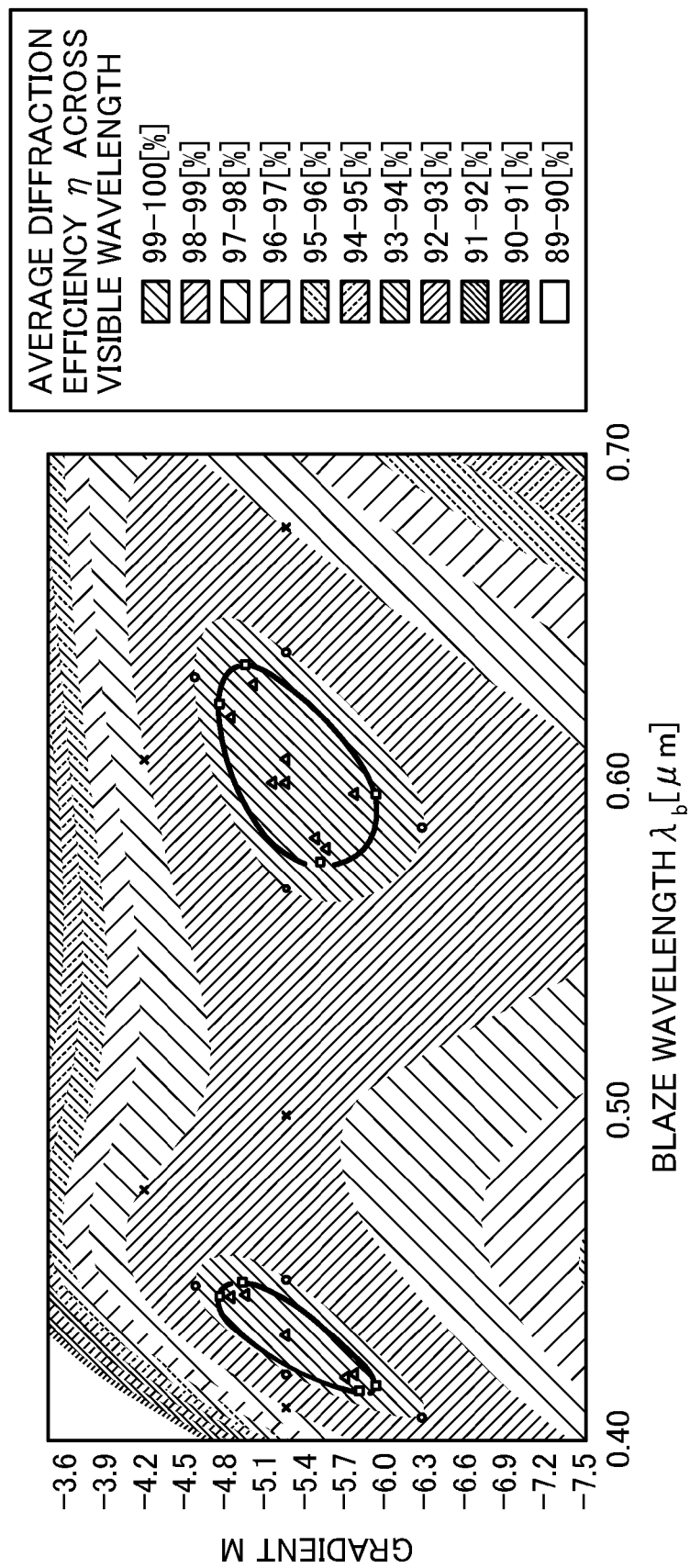
FIG. 7 is a graph illustrating the relationship of the average diffraction efficiency across visible wavelength with the inter-material gradient M and the blaze wavelength $\lambda_b$, and is a graph illustrating more preferable ranges of the inter-material gradient M and the blaze wavelength $\lambda_b$.

Further, within a range specified by expressions (7)-(9) or (10)-(12), the average diffraction efficiency η across visible wavelength is further improved. The ranges corresponding to the expressions (7)-(9) and (10)-(12) are illustrated in FIG. 7. A graph of the average diffraction efficiency η across visible wavelength based on the inter-material gradient M and the blaze wavelength $\lambda_b$ in FIG. 7 is the same as that in FIG. 4.

$$0.414 \leq \lambda_b \leq 0.450 \tag{7}$$

$$M \geq 8640558390 \times \lambda_b^6 - 22380686760.9125 \times \lambda_b^5 + 24152666332.3616 \times \lambda_b^4 - 13900381865.2731 \times \lambda_b^3 + 4499685153.88293 \times \lambda_b^2 - 776796861.97245 \times \lambda_b + 55871807.7607997 \tag{8}$$

$$M \leq -10194570607.5 \times \lambda_b^6 + 26421929920.0925 \times \lambda_b^5 - 28531440313.7911 \times \lambda_b^4 + 16430708380.9751 \times \lambda_b^3 - 5322137506.01958 \times \lambda_b^2 + 919367999.430877 \times \lambda_b - 66169280.3167743 \tag{9}$$

$$0.576 \leq \lambda_b \leq 0.638 \tag{10}$$

$$M \geq 414967120.90625 \times \lambda_b^6 - 1512185155.554 \times \lambda_b^5 + 2295832124.5403 \times \lambda_b^4 - 1858788442.14493 \times \lambda_b^3 + 846446107.028953 \times \lambda_b^2 - 205553837.085777 \times \lambda_b + 20796969.7061844 \quad (11)$$

$$M \leq -415113085.03125 \times \lambda_b^6 + 1512854887.23366 \times \lambda_b^5 - 2297046202.65628 \times \lambda_b^4 + 1859918525.18878 \times \lambda_b^3 - 847020476.777119 \times \lambda_b^2 + 205705688.874443 \times \lambda_b - 20813340.0724713 \quad (12)$$

Within the range satisfying the expressions (7)-(9) or (10)-(12), the average diffraction efficiency η across visible wavelength can be greater than or equal to 99.15%. Specifically, the inter-material gradient M and the blaze wavelength $\lambda_b$ are selected so that the expressions (8) and (9) are satisfied within a range in which the blaze wavelength $\lambda_b$ satisfies the expression (7). Alternatively, the inter-material gradient M and the blaze wavelength $\lambda_b$ are selected so that the expressions (11) and (12) are satisfied within a range in which the blaze wavelength $\lambda_b$ satisfies the expression (10). In such a manner, the average diffraction efficiency η across visible wavelength can be further improved. The improvement of the average diffraction efficiency η across visible wavelength further reduces the wavelength dependency of the diffraction efficiency across the entire visible wavelength range. Note that the expressions (7) and (10) provide a rough estimate of the blaze wavelength $\lambda_b$, and even the blaze wavelength $\lambda_b$ falling within such an estimate may not satisfy the expressions (8) and (9), or (11) and (12). That is, it is required that the blaze wavelength $\lambda_b$ satisfies the expression (7) or (10), as well as the expressions (8) and (9), or (11) and (12).

Figure 8:
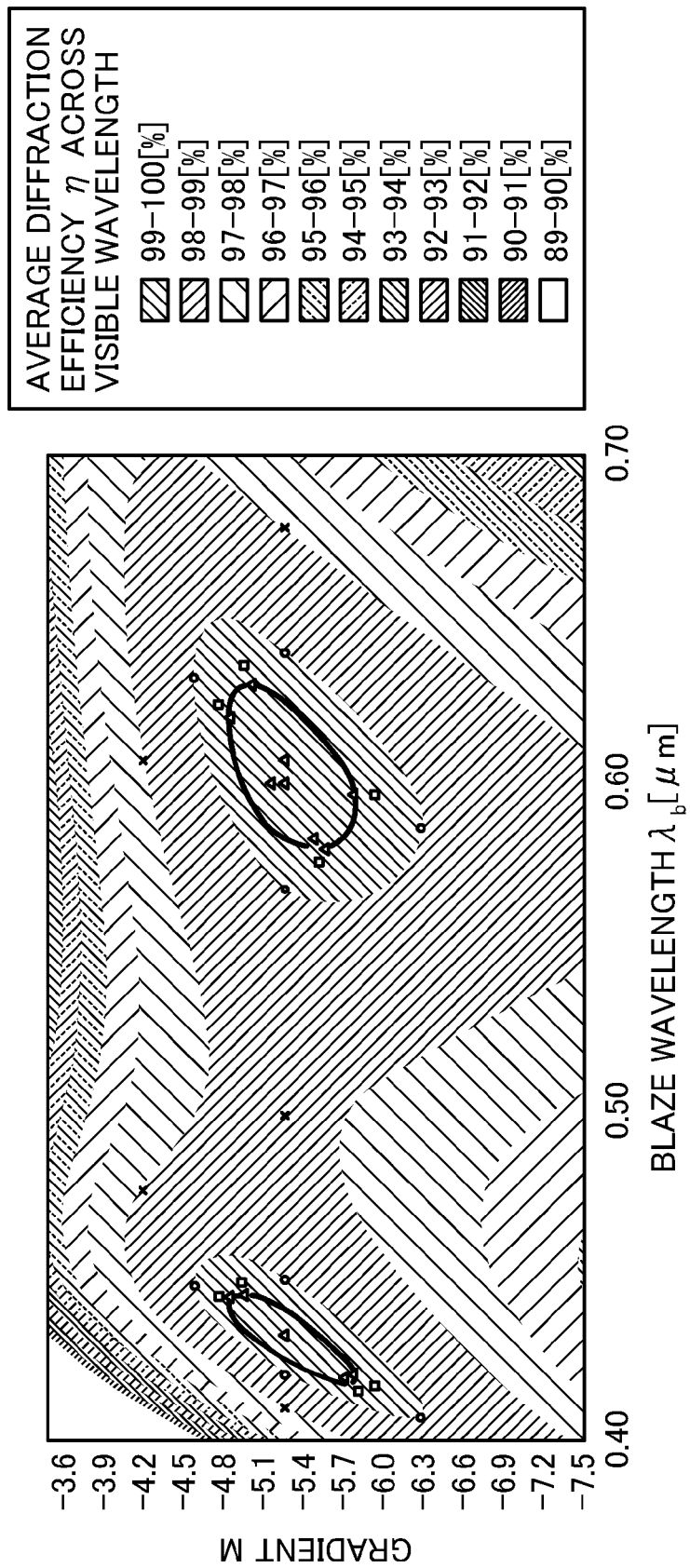
FIG. 8 is a graph illustrating the relationship of the average diffraction efficiency across visible wavelength with the inter-material gradient M and the blaze wavelength $\lambda_b$), and is a graph illustrating further preferable ranges of the inter-material gradient M and the blaze wavelength $\lambda_b$).

Further, within a range specified by expressions (13)-(15) or (16)-(18), the average diffraction efficiency η across visible wavelength can be further improved. The ranges corresponding to the expressions (13)-(15) and (16)-(18) are illustrated in FIG. 8. A graph of the average diffraction efficiency across visible wavelength based on the inter-material gradient M and the blaze wavelength $\lambda_b$ in FIG. 8 is the same as that in FIG. 4.

$$0.417 \leq \lambda_b \leq 0.447 \quad (13)$$

$$M \geq 30852412488 \times \lambda_b^6 - 79922201016.868 \times \lambda_b^5 + 86260883694.3531 \times \lambda_b^4 - 49652199810.7073 \times \lambda_b + 16075519544.8254 \times \lambda_b^2 - 2775681903.96431 \times \lambda_b + 199683678.257006 \quad (14)$$

$$M \leq -30584648780 \times \lambda_b^6 + 79226520575.83 \times \lambda_b^5 - 85507821323.3087 \times \lambda_b^4 + 49217462978.353 \times \lambda_b^3 - 15934356981.3252 \times \lambda_b^2 + 2751237292.99331 \times \lambda_b - 197920088.494362 \quad (15)$$

$$0.581 \leq \lambda_b \leq 0.632 \quad (16)$$

$$M \geq 1306900213.875 \times \lambda_b^6 - 4761329435.24312 \times \lambda_b^5 + 7227224601.18296 \times \lambda_b^4 - 5850360432.19395 \times \lambda_b^3 + 2663701689.21584 \times \lambda_b^2 - 646780698.688165 \times \lambda_b + 65431590.8897632 \quad (17)$$

$$M \leq -1286672013.625 \times \lambda_b^6 + 4687809955.26 \times \lambda_b^5 - 7115891461.56486 \times \lambda_b^4 + 5760442316.00334 \times \lambda_b^3 - 2622849972.06735 \times \lambda_b^2 + 636881343.787066 \times \lambda_b - 64431960.7758904 \quad (18)$$

Within the range satisfying the expressions (13)-(15) or (16)-(18), the average diffraction efficiency η across visible wavelength can be greater than or equal to 99.20%. Specifically, the inter-material gradient M and the blaze wavelength $\lambda_b$ are selected so that the expressions (14) and (15) are satisfied within a range in which the blaze wavelength $\lambda_b$ satisfies the expression (13). Alternatively, the inter-material gradient M and the blaze wavelength $\lambda_b$ are selected so that the expressions (17) and (18) are satisfied within a range in which the blaze wavelength $\lambda_b$ satisfies the expression (16). In such a manner, the average diffraction efficiency η across visible wavelength can be further improved. The improvement of the average diffraction efficiency η across visible wavelength further reduces the wavelength dependency of the diffraction efficiency across the entire visible wavelength range. Note that the expressions (13) and (16) provide a rough estimate of the blaze wavelength $\lambda_b$, and even the blaze wavelength $\lambda_b$ falling within such an estimate may not satisfy the expressions (14) and (15), or (17) and (18). That is, it is required that the blaze wavelength $\lambda_b$ satisfies the expression (13) or (16), as well as the expressions (14) and (15), or (17) and (18).

Figure 9:
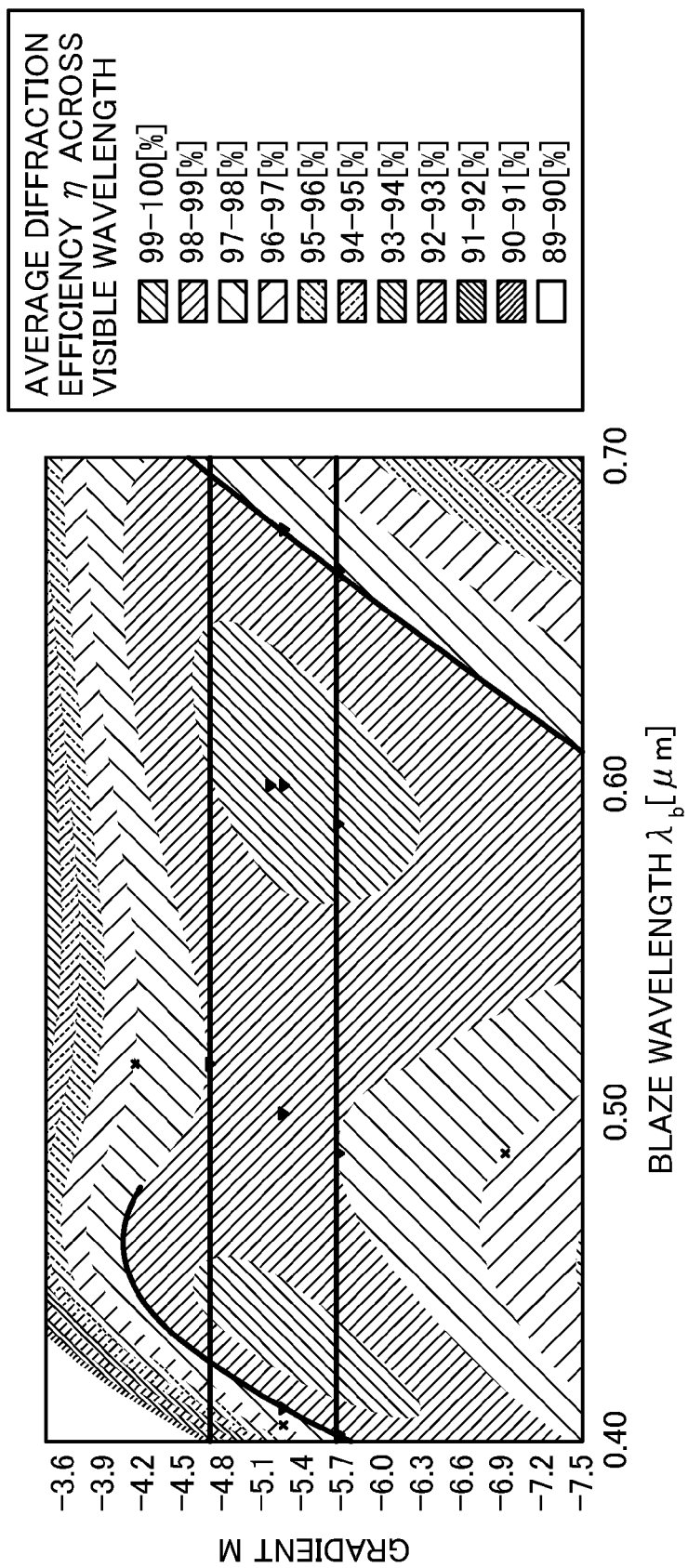
FIG. 9 is a graph illustrating the relationship of the average diffraction efficiency across visible wavelength with the inter-material gradient M and the blaze wavelength $\lambda_b$), and is a graph illustrating other preferable ranges of the inter-material gradient M and the blaze wavelength $\lambda_b$.
Figure 10:
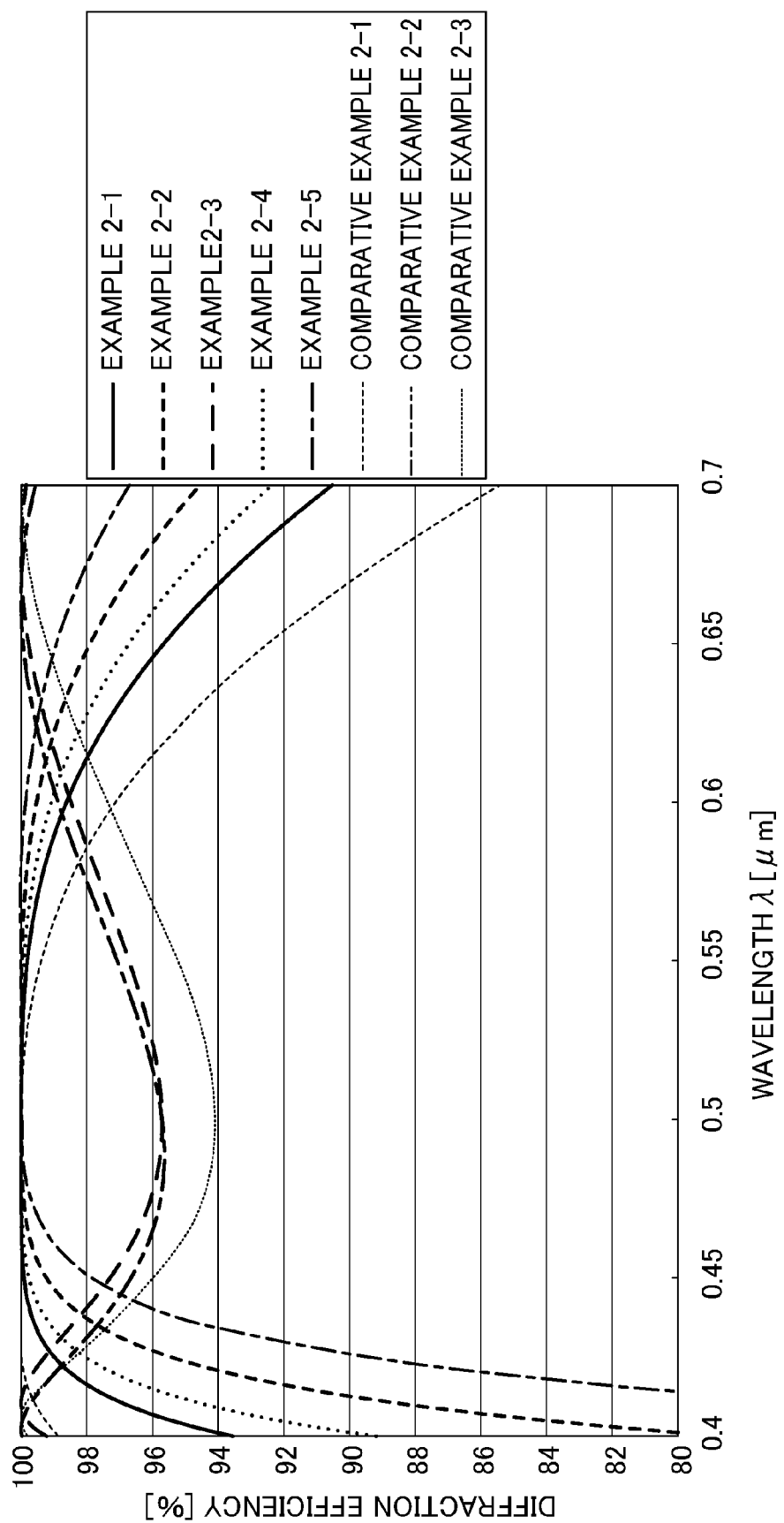
FIG. 10 is a graph illustrating the diffraction efficiency in the visible wavelength range, which corresponds to Table 3.

When satisfying expressions (19)-(23) within each of ranges of the blaze wavelength $\lambda_b$ in (i)-(iii), the average diffraction efficiency η across visible wavelength can be improved. The ranges corresponding to the expressions (19)-(23) are illustrated in FIG. 9. Data in some examples and comparative examples is illustrated in Table 3, and the diffraction efficiency in the visible wavelength range is illustrated in FIG. 10. A graph of the average diffraction efficiency η across visible wavelength based on the inter-material gradient M and the blaze wavelength $\lambda_b$ in FIG. 9 is the same as that in FIG. 4.

(i) When $0.402 \leq \lambda_b < 0.423$, $$M \geq -5.67 \quad (19)$$

$$M \leq -2059169.7421875 \times \lambda_b^6 + 5816357.49453125 \times \lambda_b^5 - 6788300.15627441 \times \lambda_b^4 + 4193835.50001671 \times \lambda_b^3 - 1448014.62341355 \times \lambda_b^2 + 265253.074154754 \times \lambda_b - 20174.8108751328 \quad (20)$$

(ii) When $0.423 \leq \lambda_b < 0.664$, $$-5.67 \leq M \leq -4.70 \quad (21)$$

(iii) When $0.664 \leq \lambda_b \leq 0.695$, $$M \geq -1737676.76663208 \times \lambda_b^6 + 6606429.15555359 \times \lambda_b^5 - 10426872.1241855 \times \lambda_b^4 + 8742622.74935995 \times \lambda_b^3 - 4106195.43419261 \times \lambda_b^2 + 1024012.6733048 \times \lambda_b - 105911.832822947 \quad (22)$$

$$M \leq -4.70 \quad (23)$$

TABLE 3

| | First Optical Member | | | Second Optical Member | | | | | Average Diffraction Efficiency |
|---|---|---|---|---|---|---|---|---|---|
| | Material | Refractive Index $n_d$ | Abbe Number $\nu_d$ | Material | Refractive Index $n_d$ | Abbe Number $\nu_d$ | Gradient M | Blaze Wavelength $\lambda_b$ (µm) | η across Visible Wavelength |
| Example 2-1 | UV Curable Resin | 1.60000 | 27.00 | Hypothetical Glass | 1.65000 | 48.49 | −5.67 | 0.488 | 98.0% ▼ |
| Example 2-2 | UV Curable Resin | 1.60000 | 27.00 | Hypothetical Glass | 1.65000 | 56.11 | −4.70 | 0.514 | 98.0% ▼ |

TABLE 3-continued

| | First Optical Member | | | Second Optical Member | | | | Average Diffraction Efficiency | |
|---|---|---|---|---|---|---|---|---|---|
| | Material | Refractive Index $n_d$ | Abbe Number $v_d$ | Material | Refractive Index $n_d$ | Abbe Number $v_d$ | Gradient M | Blaze Wavelength $\lambda_b$ (μm) | η across Visible Wavelength | |
| Example 2-3 | UV Curable Resin | 1.60000 | 27.00 | Hypothetical Glass | 1.65000 | 51.19 | −5.25 | 0.410/0.678 | 98.0% | ▼ |
| Example 2-4 | UV Curable Resin | 1.60000 | 27.00 | Hypothetical Glass | 1.65000 | 51.19 | −5.25 | 0.499 | 98.2% | ▼ |
| Example 2-5 | UV Curable Resin | 1.60000 | 27.00 | Hypothetical Glass | 1.65000 | 48.49 | −5.67 | 0.402/0.664 | 98.0% | ▼ |
| Example 1-6 | Acrylate UV Curable Resin | 1.606 | 26.00 | Phosphate Optical Glass | 1.65650 | 48.7 | −5.14 | 0.600 | 99.3% | ▼ |
| Example 1-7 | Acrylate UV Curable Resin | 1.606 | 26.00 | K-VC78 Manufactured by Sumita Optical Glass Inc. | 1.66955 | 55.4 | −5.66 | 0.588 | 99.2% | ▼ |
| Example 1-8 | SiO$_2$TI$_2$O Sol-Gel Glass | 1.718 | 19.3 | K-VC89 Manufactured by Sumita Optical Glass Inc. | 1.81000 | 41.0 | −5.25 | 0.600 | 99.3% | ▼ |
| Comparative Example 2-1 | UV Curable Resin | 1.60000 | 27.00 | Hypothetical Glass | 1.65000 | 48.49 | −6.92 | 0.488 | 97.0% | x |
| Comparative Example 2-2 | UV Curable Resin | 1.60000 | 27.00 | Hypothetical Glass | 1.65000 | 48.49 | −4.13 | 0.514 | 97.0% | x |
| Comparative Example 2-3 | UV Curable Resin | 1.60000 | 27.00 | Hypothetical Glass | 1.65000 | 51.19 | −5.25 | 0.405/0.702 | 97.0% | x |

As will be seen from FIG. 9, within all of the ranges satisfying the expressions (19)-(23), the average diffraction efficiency η across visible wavelength is greater than or equal to 98%. Such ranges covers the substantially entire visible wavelength range. Thus, if the first and second optical members 10 and 11 are selected so that the expressions (19)-(23) are satisfied, the average diffraction efficiency η across visible wavelength can be greater than or equal to 98% for any blaze wavelengths $\lambda_b$ in the visible wavelength range. That is, the blaze wavelength $\lambda_b$ and the first and second optical members 10 and 11 can be more flexibly selected while the wavelength dependency of the diffraction efficiency across the entire visible wavelength range can be reduced.

Figure 11:
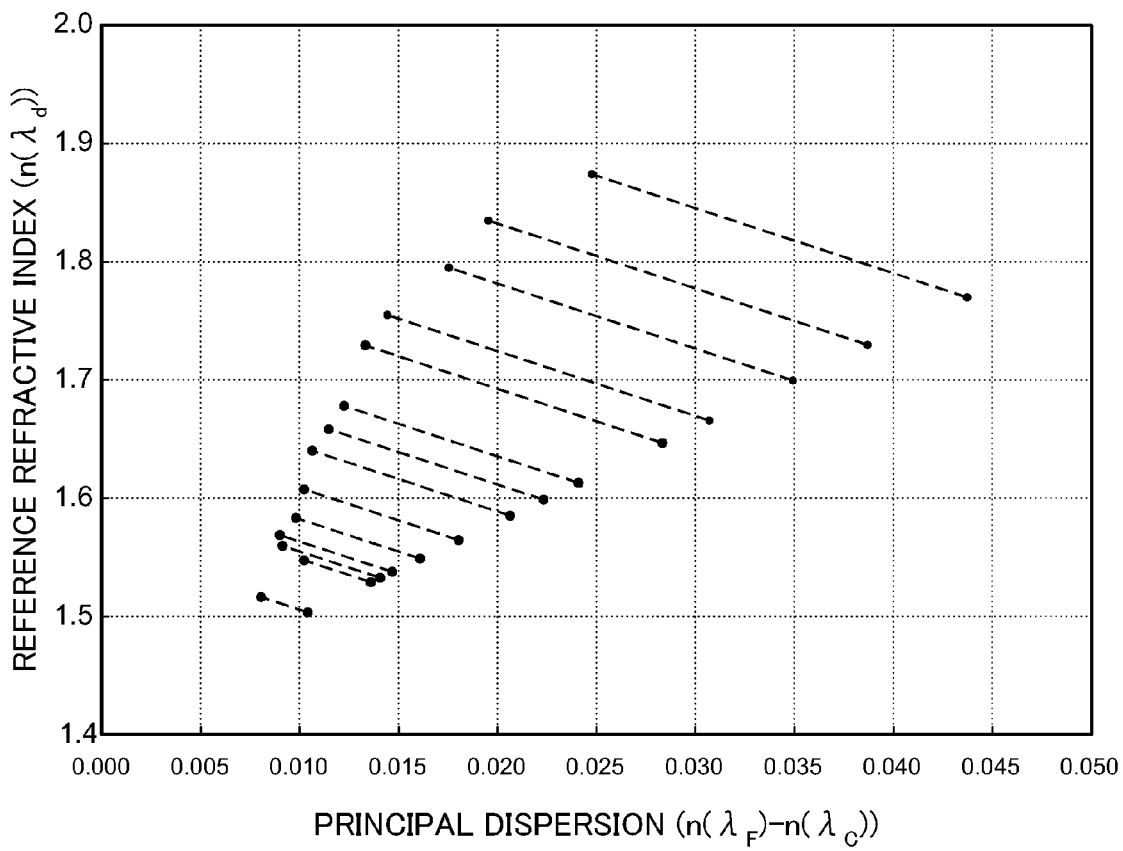
FIG. 11 is a graph illustrating a relationship between a principal dispersion and a reference refractive index of optical material.

Various combinations of the first and second optical members 10 and 11, which are selected so as to have the same inter-material gradient M are illustrated in Table 4 and FIG. 11. A vertical axis of a graph in FIG. 11 is a reference refractive index ($n(\lambda_d)$), and a horizontal axis is a principal dispersion ($n(\lambda_F)-n(\lambda_C)$).

TABLE 4

| | First Optical Member | Refractive Index $n_d$ | Abbe Number $v_d$ | Second Optical Member | Refractive Index $n_d$ | Abbe Number $v_d$ | Gradient M | Refractive Index Difference |
|---|---|---|---|---|---|---|---|---|
| Example 3-1 | SiO$_2$/TI$_2$O | 1.503345 | 48.31435 | BSL7 | 1.51633 | 64.1 | −5.495 | 0.012985 |
| Example 3-2 | SiO$_2$/TI$_2$O | 1.528818 | 38.87719 | BAL5 | 1.547393 | 53.5507 | −5.495 | 0.018575 |
| Example 3-3 | SiO$_2$/TI$_2$O | 1.532572 | 37.84758 | BAL50 | 1.559625 | 61.1727 | −5.495 | 0.027053 |
| Example 3-4 | SiO$_2$/TI$_2$O | 1.5375 | 36.59582 | BAL22 | 1.568729 | 63.1624 | −5.495 | 0.031229 |
| Example 3-5 | SiO$_2$/TI$_2$O | 1.548684 | 34.1104 | BAL42 | 1.58313 | 59.4 | −5.495 | 0.034446 |
| Example 3-6 | SiO$_2$/TI$_2$O | 1.564346 | 31.27741 | BSM7 | 1.607291 | 59.3756 | −5.495 | 0.042945 |
| Example 3-7 | SiO$_2$/TI$_2$O | 1.585108 | 28.35037 | BSM81 | 1.64 | 60.1 | −5.495 | 0.054892 |
| Example 3-8 | SiO$_2$/TI$_2$O | 1.598666 | 26.80608 | LAL11 | 1.658293 | 57.3326 | −5.495 | 0.059627 |
| Example 3-9 | SiO$_2$/TI$_2$O | 1.612819 | 25.4257 | LAL12 | 1.6779 | 55.3 | −5.495 | 0.065081 |

TABLE 4-continued

| | First Optical Member | Refractive Index $n_d$ | Abbe Number $v_d$ | Second Optical Member | Refractive Index $n_d$ | Abbe Number $v_d$ | Gradient M | Refractive Index Difference |
|---|---|---|---|---|---|---|---|---|
| Example 3-10 | SiO$_2$/Tl$_2$O | 1.646697 | 22.82156 | LAL18 | 1.72916 | 54.7 | −5.495 | 0.082463 |
| Example 3-11 | SiO$_2$/Tl$_2$O | 1.665617 | 21.67982 | YGH51 | 1.755 | 52.3 | −5.495 | 0.089383 |
| Example 3-12 | SiO$_2$/Tl$_2$O | 1.699478 | 20.0224 | LAH67 | 1.794997 | 45.294 | −5.495 | 0.095519 |
| Example 3-13 | SiO$_2$/Tl$_2$O | 1.72959 | 18.85305 | LAH55 | 1.83481 | 42.7 | −5.495 | 0.10522 |
| Example 3-14 | SiO$_2$/Tl$_2$O | 1.769819 | 17.60496 | LAH75 | 1.873996 | 35.286 | −5.495 | 0.104177 |

The first optical member 10 is SiO$_2$—Tl$_2$O glass formed by mixing SiO$_2$ and Tl$_2$O together, and a mixing ratio of such components is changed to realize various refractive indexes $n_1(\lambda_d)$ and Abbe numbers $v_{d1}$. The second optical member 11 is optical glass manufactured by Ohara Inc., and is illustrated with model numbers in Table 2. In any of the combinations of the first and second optical members 10 and 11, the inter-material gradient M is −5.495. That is, in FIG. 11, a line connecting between the first optical member 10 and the second optical member 11 in each of the combinations is parallel to other lines.

In each of the combinations of the first and second optical members 10 and 11, the blaze wavelength $\lambda_b$ is set to 0.605 µm, and then the grating height h is obtained based on the expressions (31)-(34). The obtained grating height h is used to obtain the average diffraction efficiency η across visible wavelength as described above. That is, the grating height h is substituted into the expression (29), and the wavelength λ is changed in the visible wavelength range. Then, the diffraction efficiency $\eta_1(\lambda)$ of first-order diffracted light for each wavelength λ is obtained based on the expression (30). Finally, the diffraction efficiency $\eta_1(\lambda)$ of first-order diffracted light for each wavelength λ is averaged across the visible wavelength range to obtain the average diffraction efficiency η across visible wavelength. Table 5 illustrates the average diffraction efficiency η across visible wavelength and diffraction efficiencies $\eta_1(\lambda)$ for some representative wavelengths in each of the combinations corresponding to Table 4.

TABLE 5

| | | | Diffraction Efficiency (%) | | | | | | |
|---|---|---|---|---|---|---|---|---|---|
| | Blaze Wavelength $\lambda_b$ (µm) | Grating Height h (µm) | Average Diffraction Efficiency η across Visible Wavelength | 0.400 µm | 0.450 µm | 0.500 µm | 0.550 µm | 0.600 µm | 0.650 µm | 0.700 µm |
| Example 3-1 | 0.605 | 45.9 | 99.3 | 97.5 | 99.4 | 98.8 | 99.4 | 100.0 | 99.4 | 97.1 |
| Example 3-2 | 0.605 | 32.1 | 99.3 | 97.5 | 99.4 | 98.8 | 99.4 | 100.0 | 99.4 | 97.1 |
| Example 3-3 | 0.605 | 22.0 | 99.3 | 97.5 | 99.4 | 98.8 | 99.4 | 100.0 | 99.4 | 97.1 |
| Example 3-4 | 0.605 | 19.1 | 99.3 | 97.5 | 99.4 | 98.8 | 99.4 | 100.0 | 99.4 | 97.1 |
| Example 3-5 | 0.605 | 17.3 | 99.3 | 97.5 | 99.4 | 98.8 | 99.4 | 100.0 | 99.4 | 97.1 |
| Example 3-6 | 0.605 | 13.9 | 99.3 | 97.5 | 99.4 | 98.8 | 99.4 | 100.0 | 99.4 | 97.1 |
| Example 3-7 | 0.605 | 10.9 | 99.3 | 97.5 | 99.4 | 98.8 | 99.4 | 100.0 | 99.4 | 97.1 |
| Example 3-8 | 0.605 | 10.0 | 99.3 | 97.5 | 99.4 | 98.8 | 99.4 | 100.0 | 99.4 | 97.1 |
| Example 3-9 | 0.605 | 9.2 | 99.3 | 97.5 | 99.4 | 98.8 | 99.4 | 100.0 | 99.4 | 97.1 |
| Example 3-10 | 0.605 | 7.2 | 99.3 | 97.5 | 99.4 | 98.8 | 99.4 | 100.0 | 99.4 | 97.1 |
| Example 3-11 | 0.605 | 6.7 | 99.3 | 97.5 | 99.4 | 98.8 | 99.4 | 100.0 | 99.4 | 97.1 |
| Example 3-12 | 0.605 | 6.2 | 99.3 | 97.5 | 99.4 | 98.8 | 99.4 | 100.0 | 99.4 | 97.1 |
| Example 3-13 | 0.605 | 5.7 | 99.3 | 97.5 | 99.4 | 98.8 | 99.4 | 100.0 | 99.4 | 97.1 |
| Example 3-14 | 0.605 | 5.7 | 99.3 | 97.5 | 99.4 | 98.8 | 99.4 | 100.0 | 99.4 | 97.1 |

As will be seen from Table 5, an identical pair of the inter-material gradient M and the blaze wavelength $\lambda_b$ produces constant diffraction efficiency $\eta_1(\lambda)$ for each wavelength and constant average diffraction efficiency $\eta$ across visible wavelength. The graphs of FIGS. 4, 5, and 7-9 illustrate the results when the inter-material gradient M is changed by changing the Abbe number $v_{d2}$ of the second optical member 11 in the state in which the refractive index $n_1(\lambda_d)$ and the Abbe number $v_{d1}$ at the d line of the first optical member 10, and the refractive index $n_2(\lambda_d)$ at the d line of the second optical member 11 are fixed to the predetermined values. However, an identical inter-material gradient M produces constant average diffraction efficiency $\eta$ across visible wavelength for the certain blaze wavelength $\lambda_b$. Thus, even if the refractive index $n_1(\lambda_d)$ and the Abbe number $v_{d1}$ at the d line of the first optical member 10, and the refractive index $n_2(\lambda_d)$ at the d line of the second optical member 11 are different, results similar to those in FIGS. 4, 5, and 7-9 may be obtained. Thus, the expressions (1)-(23) are satisfied regardless of the refractive index $n_1(\lambda_d)$ and the Abbe number $v_{d1}$ at the d line of the first optical member 10, and the refractive index $n_2(\lambda_d)$ and the Abbe number $v_{d2}$ at the d line of the second optical member 11.

Next, a relationship between the grating height h (μm) and the absorption coefficient $\alpha$ (mm$^{-1}$) will be described.

Figure 12:
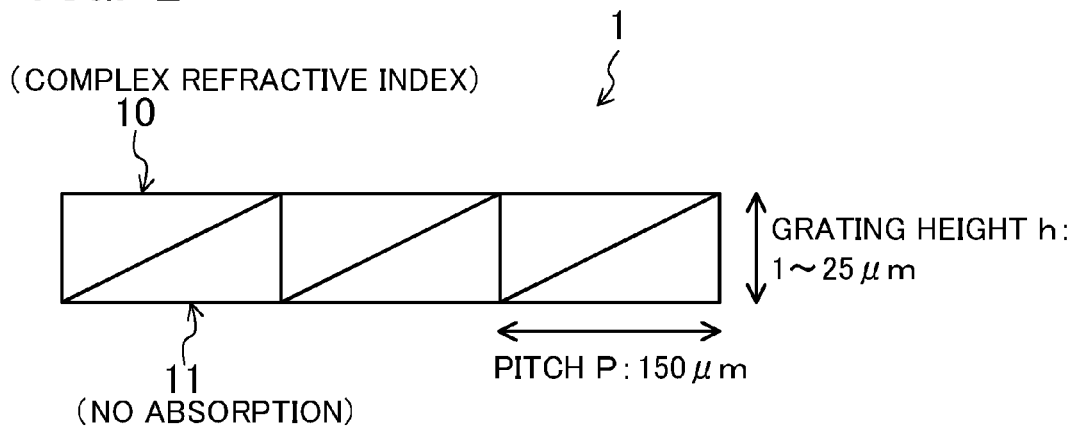
FIG. 12 is a model of a diffraction grating used for a simulation by a RCWA method.

It is assumed that the first optical member 10 is made of optical material having a complex refractive index, and the second optical member 11 is made of optical material having no absorption. As illustrated in FIG. 12, a grating pitch P of the diffraction grating 13 is 150 μm, and the blaze wavelength $\lambda_b$ is at the d line (0.587562 μm). A simulation was performed by a rigorous coupled-wave analysis (RCWA) method while changing the grating height h within a range of 1-25 μm, and changing the complex refractive index. In this way, the diffraction efficiency of first-order diffracted light for the blaze wavelength $\lambda_b$ was obtained. The results are illustrated in FIG. 13.

Figure 13:
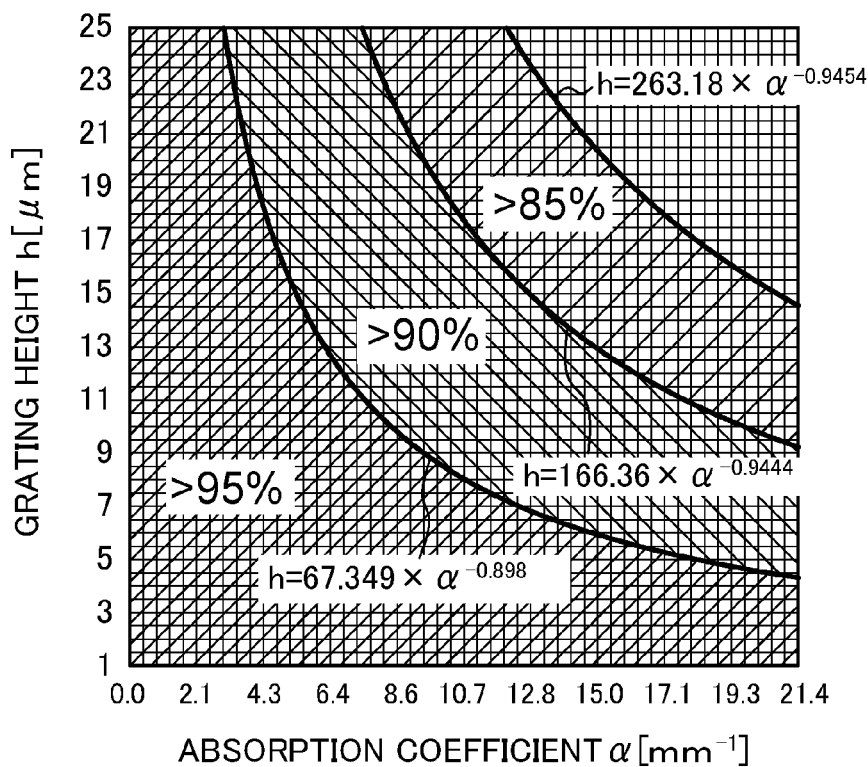
FIG. 13 is a graph illustrating a relationship of the diffraction efficiency with an absorption coefficient $\alpha$ and a grating height h.

As will be seen from FIG. 13, within a range satisfying expressions (24) and (25), the diffraction efficiency for the blaze wavelength $\lambda_b$ can be greater than 85%:

$$\alpha \geq 0.04 \tag{24}$$

$$h \leq 263.18 \times \alpha^{-0.9454} \tag{25}$$

Thus, even if the absorption coefficient is greater than or equal to 0.04 mm$^{-1}$, i.e., the optical material which is not optically transparent is used, the high diffraction efficiency can be realized as long as the expression (25) is satisfied. Thus, such material may be employed as the first optical member 10. Consequently, the range of the first optical member 10 to be selected can be expanded.

Preferably, within a range satisfying an expression (26) in addition to the expression (25), the diffraction efficiency for the blaze wavelength $\lambda_b$ can be greater than 90%:

$$h \leq 166.36 \times \alpha^{-0.9444} \tag{26}$$

More preferably, within a range satisfying an expression (27) in addition to the expression (25), the diffraction efficiency for the blaze wavelength $\lambda_b$ can be greater than 95%:

$$h \leq 67.349 \times \alpha^{-0.898} \tag{27}$$

As described above, the expression (26) or (27) is satisfied, and therefore the optical material which is not optically transparent is employed as the first optical member 10 while maintaining the high diffraction efficiency. That is, both of the maintenance of the high diffraction efficiency and the expansion of the range of the material selection can be realized.

Other Embodiments

The present disclosure may have the following configurations in the foregoing embodiment.

That is, in the foregoing embodiment, the diffractive optical element 1 is employed in the interchangeable lens 200, but the present disclosure is not limited to such a configuration. The diffractive optical element 1 may be employed as a lens element inside the camera 100. In addition, the present disclosure is not limited to the diffractive optical element 1 serving as the lens, and the diffractive optical element 1 may be applied for purposes other than the foregoing purpose.

In the foregoing embodiment, the first optical member 10 is made of resin material, and the second optical member 11 is made of glass material. However, the present disclosure is not limited to such a configuration. The first optical member 10 may be made of glass material, and the second optical member 11 may be made of resin material. Alternatively, both of the first and second optical members 10 and 11 may be made of glass material or resin material.

The first and second optical members 10 and 11 may be made of material formed by mixing inorganic particulates (so-called "nanocomposites") with resin. The inorganic particulates can adjust the refractive index and the Abbe number of the optical member.

The diffractive optical element 1 may satisfy at least one group of the expressions (1)-(3), (4)-(6), or (19)-(23). In addition to the expressions, the diffractive optical element 1 may preferably satisfy the expressions (24) and (25).

Figure 14:
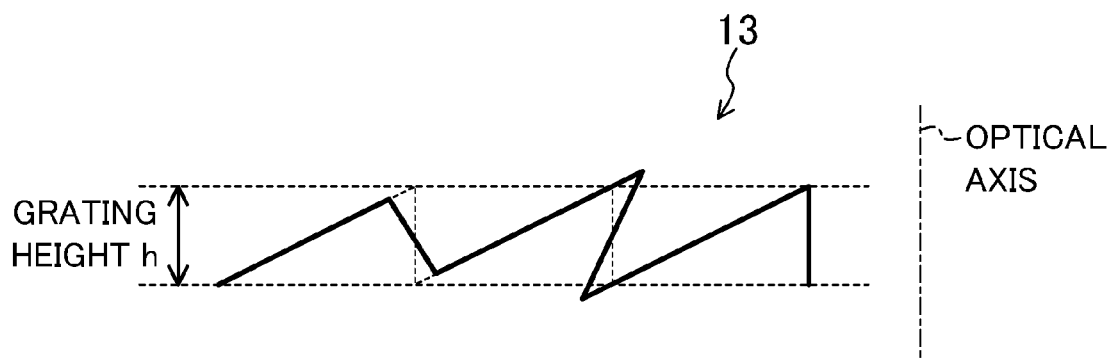
FIG. 14 is a schematic diagram for illustrating the grating height h for a non-uniform shape of the diffraction grating.

If there are various grating heights as illustrated in FIG. 14, a distance between an intersection point of a line parallel to the optical axis, and one of the adjacent inclined surfaces; and an intersection point of the line and the other inclined surface is the grating height h.

The refractive index $n(\lambda)$ for each wavelength $\lambda$ is calculated based on the Hertzberger's expressions, but the present disclosure is not limited to such a configuration. The refractive index $n(\lambda)$ may be an actual measured value, or may be a value calculated by a publicly-known method.

The foregoing embodiments have been set forth merely for purposes of preferred examples in nature, and are not intended to limit the scope, applications, and use of the present disclosure.

As described above, the present disclosure is useful for the diffractive optical element in which the two optical members are stacked, and the diffraction grating is formed at the interface between the two optical members. In particular, the present disclosure is useful for the diffractive optical element intended for light in the visible wavelength range.

What is claimed is:

1. A diffractive optical element, comprising:
first and second optical members which are stacked, and which have a diffraction grating formed at an interface between the first and second optical members,
wherein expressions (1)-(3) or (4)-(6) are satisfied:

$$0.400 \leq \lambda_b \leq 0.460 \tag{1}$$

$$M \geq 1339242229.625 \times \lambda_b^6 - 3467101052.6675 \times \lambda_b^5 + 3739417158.03949 \times \lambda_b^4 - 2150706261.50666 \times \lambda_b^3 + 695699517.122797 \times \lambda_b^2 - 120005677.292515 \times \lambda_b + 8624042.63627238 \tag{2}$$

$$M \leq -1332094191.9375 \times \lambda_b^6 + 3449257434.95906 \times \lambda_b^5 - 3720886459.39374 \times \lambda_b^4 + 2140458094.5947 \times \lambda_b^3 - 692516647.829495 \times \lambda_b^2 + 119479540.773725 \times \lambda_b - 8587922.98149309 \tag{3}$$

$$0.560 \leq \lambda_b \leq 0.650 \tag{4}$$

$$M \geq 79855185.5390625 \times \lambda_b^6 - 291350087.799711 \times \lambda_b^5 + 442815879.530274 \times \lambda_b^4 - 358873164.839002 \times \lambda_b^3 + 163567486.506001 \times \lambda_b^2 - 39753252.4920047 \times \lambda_b + 4024975.0978217 \quad (5)$$

$$M \leq -82526017.6289062 \times \lambda_b^6 + 301239002.375121 \times \lambda_b^5 - 458051447.988191 \times \lambda_b^4 + 371372898.921825 \times \lambda_b^3 - 169325896.092434 \times \lambda_b^2 + 41165269.8970695 \times \lambda_b - 4168933.51144255 \quad (6)$$

where "$\lambda_b$" is a blaze wavelength (μm);
$M = \{n_1(\lambda_2) - n_2(\lambda_2)\} / \{n_1(\lambda_1) - n_1(\lambda_3) - n_2(\lambda_1) + n_2(\lambda_3)\}$;
"$n_1(\lambda)$" is a refractive index of the first optical member for incident light having a wavelength $\lambda$;
"$n_2(\lambda)$" is a refractive index of the second optical member for the incident light having the wavelength $\lambda$;
"$\lambda_1$" is 0.486133 μm;
"$\lambda_2$" is 0.587562 μm; and
"$\lambda_3$" is 0.656273 μm.

2. The diffractive optical element of claim 1, wherein expressions (7)-(9) or (10)-(12) are satisfied:

$$0.414 \leq \lambda_b \leq 0.450 \quad (7)$$

$$M \geq 8640558390 \times \lambda_b^6 - 22380686760.9125 \times \lambda_b^5 + 24152666332.3616 \times \lambda_b^4 - 13900381865.2731 \times \lambda_b^3 + 4499685153.88293 \times \lambda_b^2 - 776796861.97245 \times \lambda_b + 55871807.7607997 \quad (8)$$

$$M \leq -10194570607.5 \times \lambda_b^6 + 26421929920.0925 \times \lambda_b^5 - 28531440313.7911 \times \lambda_b^4 + 16430708380.9751 \times \lambda_b^3 - 5322137506.01958 \times \lambda_b^2 + 919367999.430877 \times \lambda_b - 66169280.3167743 \quad (9)$$

$$0.576 \leq \lambda_b \leq 0.638 \quad (10)$$

$$M \geq 414967120.90625 \times \lambda_b^6 - 1512185155.554 \times \lambda_b^5 + 2295832124.5403 \times \lambda_b^4 - 1858788442.14493 \times \lambda_b^3 + 846446107.028953 \times \lambda_b^2 - 205553837.085777 \lambda_b \times 20796969.7061844 \quad (11)$$

$$M \leq -415113085.03125 \times \lambda_b^6 + 1512854887.23366 \times \lambda_b^5 - 2297046202.65628 \times \lambda_b^4 + 1859918525.18878 \times \lambda_b^3 - 847020476.777119 \times \lambda_b^2 + 205705688.874443 \times \lambda_b - 20813340.0724713 \quad (12)$$

3. The diffractive optical element of claim 1, wherein expressions (13)-(15) or (16)-(18) are satisfied:

$$0.417 \leq \lambda_b \leq 0.447 \quad (13)$$

$$M \geq 30852412488 \times \lambda_b^6 - 79922201016.868 \times \lambda_b^5 + 86260883694.3531 \times \lambda_b^4 - 49652199810.7073 \times \lambda_b^3 + 16075519544.8254 \times \lambda_b^2 - 2775681903.96431 \times \lambda_b + 199683678.257006 \quad (14)$$

$$M \leq -30584648780 \times \lambda_b^6 + 79226520575.83 \times \lambda_b^5 - 85507821323.3087 \times \lambda_b^4 + 49217462978.353 \times \lambda_b^3 - 15934356981.3252 \times \lambda_b^2 + 2751237292.99331 \times \lambda_b - 197920088.494362 \quad (15)$$

$$0.581 \leq \lambda_b \leq 0.632 \quad (16)$$

$$M \geq 1306900213.875 \times \lambda_b^6 - 4761329435.24312 \times \lambda_b^5 + 7227224601.18296 \times \lambda_b^4 - 5850360432.19395 \times \lambda_b^3 + 2663701689.21584 \times \lambda_b^2 - 646780698.688165 \times \lambda_b + 65431590.8897632 \quad (17)$$

$$M \leq -1286672013.625 \times \lambda_b^6 + 4687809955.26 \times \lambda_b^5 - 7115891461.56486 \times \lambda_b^4 + 5760442316.00334 \times \lambda_b^3 - 2622849972.06735 \times \lambda_b^2 + 636881343.787066 \times \lambda_b - 64431960.7758904 \quad (18)$$

4. The diffractive optical element of claim 1, wherein
an absorption coefficient α (mm$^{-1}$) of the first optical member and a grating height h (μm) of the diffraction grating satisfy expressions (24) and (25):

$$\alpha \geq 0.04 \quad (24)$$

$$h \leq 263.18 \times \alpha^{-0.9454} \quad (25)$$

5. An optical device, comprising:
an optical imaging system for focusing light bundles on a predetermined surface,
wherein the optical imaging system has the diffractive optical element of claim 1.

6. A diffractive optical member, comprising:
first and second optical members which are stacked, and which have a diffraction grating formed at an interface between the first and second optical members,
wherein expressions (19)-(23) are satisfied depending on a blaze wavelength (μm):

(i) when $0.402 \leq \lambda_b < 0.423$, $$M \geq -5.67 \quad (19)$$

$$M \leq -2059169.7421875 \times \lambda_b^6 + 5816357.49453125 \times \lambda_b^5 - 6788300.15627441 \times \lambda_b^4 + 4193835.50001671 \times \lambda_b^3 - 1448014.62341355 \times \lambda_b^2 + 265253.074154754 \times \lambda_b - 20174.8108751328 \quad (20)$$

(ii) when $0.423 \leq \lambda_b < 0.664$, $$-5.67 \leq M \leq -4.70 \quad (21)$$

(iii) when $0.664 \leq \lambda_b \leq 0.695$, $$M \geq -1737676.76663208 \times \lambda_b^6 + 6606429.15555359 \times \lambda_b^5 - 10426872.1241855 \times \lambda_b^4 + 8742622.74935995 \times \lambda_b^3 - 4106195.43419261 \times \lambda_b^2 + 1024012.6733048 \times \lambda_b - 105911.832822947 \quad (22)$$

$$M \leq -4.70 \quad (23)$$

where $M = \{n_1(\lambda_2) - n_2(\lambda_2)\} / \{n_1(\lambda_1) - n_1(\lambda_3) - n_2(\lambda_1) + n_2(\lambda_3)\}$;
"$n_1(\lambda)$" is a refractive index of the first optical member for incident light having a wavelength $\lambda$;
"$n_2(\lambda)$" is a refractive index of the second optical member for the incident light having the wavelength $\lambda$;
"$\lambda_1$" is 0.486133 μm;
"$\lambda_2$" is 0.587562 μm; and
"$\lambda_3$" is 0.656273 μm.

7. The diffractive optical element of claim 6, wherein
an absorption coefficient α (mm$^{-1}$) of the first optical member and a grating height h (μm) of the diffraction grating satisfy expressions (24) and (25):

$$\alpha \geq 0.04 \quad (24)$$

$$h \leq 263.18 \times \alpha^{-0.9454} \quad (25)$$

* * * * *